United States Patent
Santhanam et al.

(10) Patent No.: US 9,544,943 B2
(45) Date of Patent: Jan. 10, 2017

(54) COMMUNICATING VIA A FEMTO ACCESS POINT WITHIN A WIRELESS COMMUNICATIONS SYSTEM

(75) Inventors: Arvind V. Santhanam, San Diego, CA (US); Karthika Paladugu, San Diego, CA (US); Prashanth Hande, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 657 days.

(21) Appl. No.: 12/939,753

(22) Filed: Nov. 4, 2010

(65) Prior Publication Data

US 2012/0113862 A1 May 10, 2012

(51) Int. Cl.
H04W 88/08 (2009.01)
H04W 84/04 (2009.01)
H04W 36/14 (2009.01)

(52) U.S. Cl.
CPC ........... *H04W 84/045* (2013.01); *H04W 36/14* (2013.01)

(58) Field of Classification Search
CPC .......... H04L 41/12; H04L 45/02; H04L 45/00; H04L 41/04
USPC ................................ 370/254, 241, 251, 329
See application file for complete search history.

(56) References Cited

U.S. PATENT DOCUMENTS

| | | | |
|---|---|---|---|
| 8,774,852 B2 | 7/2014 | Meshkati et al. | |
| 2002/0069031 A1 | 6/2002 | Lehman | |
| 2005/0169203 A1* | 8/2005 | Sinnarajah et al. | 370/312 |
| 2005/0176420 A1 | 8/2005 | Graves et al. | |
| 2006/0040681 A1* | 2/2006 | Julka et al. | 455/458 |
| 2007/0191012 A1 | 8/2007 | Park et al. | |
| 2009/0080373 A1* | 3/2009 | Song | H04L 12/185 370/328 |

(Continued)

FOREIGN PATENT DOCUMENTS

| | | |
|---|---|---|
| CN | 101553023 A | 10/2009 |
| CN | 101765189 A | 6/2010 |

(Continued)

OTHER PUBLICATIONS

International Search Report and Written Opinion—PCT/US2011/059127—ISA/EPO—Jul. 18, 2012.

(Continued)

*Primary Examiner* — Andrew Lai
*Assistant Examiner* — Zhiren Qin
(74) *Attorney, Agent, or Firm* — Hyung Myung

(57) ABSTRACT

In an embodiment, a user of a wireless communications device (WCD) is notified when operating in a serving area of a FEMTO access point (AP). In another embodiment, the WCD can notify an application server (AS) that the WCD is served by the FEMTO AP. In another embodiment, the AS can set a service level for a server-arbitrated communication session (CS) based on the FEMTO AP serving status of participating WCDs. In another embodiment, the FEMTO AP can determine to use a downlink control or signaling channel to transmit data to the WCD. In another embodiment, based on its serving FEMTO AP status, the WCD can (i) modify its participation level in the CS and/or (ii) selectively track usage. In another embodiment, the WCD or FEMTO AP can measure performance parameters of the CS to determine whether to trigger a handoff of the WCD to a different AP.

19 Claims, 15 Drawing Sheets

(56) References Cited

U.S. PATENT DOCUMENTS

| | | | |
|---|---|---|---|
| 2009/0131072 A1* | 5/2009 | Razdan | H04W 4/10 455/456.1 |
| 2009/0156208 A1* | 6/2009 | Vesterinen et al. | 455/435.1 |
| 2009/0164547 A1* | 6/2009 | Ch'ng | H04W 48/08 709/201 |
| 2009/0176479 A1 | 7/2009 | Vikberg et al. | |
| 2009/0253461 A1* | 10/2009 | Kuwahara | 455/561 |
| 2009/0288145 A1* | 11/2009 | Huber | G06Q 20/1235 726/3 |
| 2010/0008326 A1* | 1/2010 | Albanese | H04W 72/005 370/331 |
| 2010/0041365 A1 | 2/2010 | Lott et al. | |
| 2010/0080179 A1 | 4/2010 | Santhanam | |
| 2010/0113070 A1* | 5/2010 | Nigam et al. | 455/458 |
| 2010/0130209 A1 | 5/2010 | Florkey et al. | |
| 2010/0159960 A1* | 6/2010 | Chou et al. | 455/458 |
| 2010/0165857 A1 | 7/2010 | Meylan et al. | |
| 2010/0167732 A1* | 7/2010 | Vakil | H04W 60/00 455/435.1 |
| 2010/0178895 A1* | 7/2010 | Maeda | H04W 76/007 455/404.1 |
| 2010/0208879 A1* | 8/2010 | Meriaz | H04M 3/42 379/201.02 |
| 2010/0240365 A1 | 9/2010 | Chen | |
| 2010/0317380 A1* | 12/2010 | Ergen | H04W 4/00 455/466 |
| 2012/0108215 A1* | 5/2012 | Kameli | 455/412.2 |

FOREIGN PATENT DOCUMENTS

| | | |
|---|---|---|
| EP | 1715625 A1 | 10/2006 |
| EP | 2194739 A1 | 6/2010 |
| JP | 5153043 A | 6/1993 |
| JP | 2007110543 A | 4/2007 |
| JP | 2010239549 A | 10/2010 |
| JP | 2011518471 A | 6/2011 |
| JP | 2012525090 A | 10/2012 |
| WO | 2009117658 A1 | 9/2009 |
| WO | 2010017221 A1 | 2/2010 |
| WO | 2010119728 A1 | 10/2010 |
| WO | WO-2010124246 A2 | 10/2010 |
| WO | WO-2010124249 A1 | 10/2010 |

OTHER PUBLICATIONS

Mitsubishi Electric: "Macro and Femto eNB Identifiers", 3GPP Draft; R3-090024 Macro and FEMTO ENB IDS), 3rd Generation Partnership Project (3GPP), Mobile Competence Centre ; 650, Route Des Lucioles ; F-06921 Sophia-Antipolis Cedex ; France, No. Athens, Greece; 20090204, Feb. 4, 2009 (Feb. 4, 2009), XP050324816, [retrieved on Feb. 4, 2009].

Ott D., et al., "3GPP2 Femtocell Zone Enablers", Qualcomm, Jun. 21, 2010 (Jun. 21, 2010), pp. 1-17, XP002653225, Retrieved from the Internet: URL:ftp.3gpp2.org [retrieved on Jul. 26, 2011].

Ericsson: "Support for Hybrid Home Base Stations", 3GPP TSG RAN2 #65bis Tdoc R2-092083, Mar. 17, 2009, 4 pages.

RAN2: "Answer LS on Coding of Home (e) NodeB Identifier", 3GPP TSG-RAN2 Meeting #63 R2-084894, Aug. 22, 2008, 2 Pages.

* cited by examiner

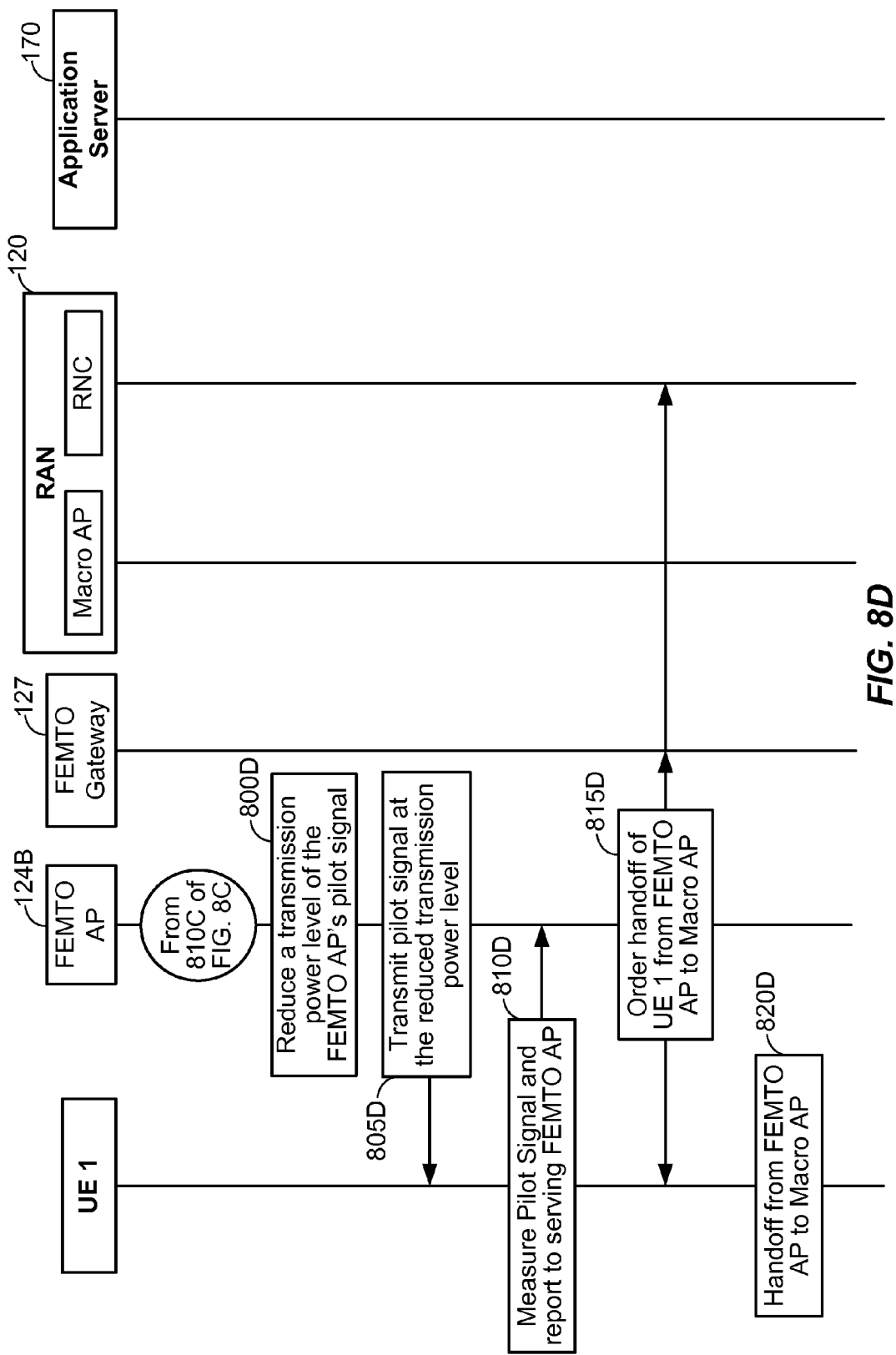

COMMUNICATING VIA A FEMTO ACCESS POINT WITHIN A WIRELESS COMMUNICATIONS SYSTEM

BACKGROUND OF THE INVENTION

1. Field of the Invention

Embodiments of the invention relate to communicating via a FEMTO access point (AP) within a wireless communications system.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (W-CDMA), CDMA2000 (such as CDMA2000 1xEV-DO standards, for example) or TD-SCDMA.

In W-CDMA wireless communication systems, user equipments (UEs) receive signals from fixed position Node Bs (also referred to as cell sites or cells) that support communication links or service within particular geographic regions adjacent to or surrounding the base stations. Node Bs provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the Node Bs generally interact with UEs through an over the air interface and with the RAN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as W-CDMA, CDMA, FDMA, TDMA, GSM, etc. In a dispatch model, communication between endpoints (e.g., UEs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

SUMMARY

In an embodiment, a user of a wireless communications device is notified when operating in a serving area of a FEMTO access point (AP). In another embodiment, the wireless communications device can notify an application server that the wireless communications device is served by the FEMTO AP. In another embodiment, the application server can set a service level for a communication session based on the FEMTO AP serving status of participating wireless communications devices. In another embodiment, the FEMTO AP can determine to use a downlink control or signaling channel to transmit data to the wireless communications device. In another embodiment, the wireless communications device can determine to determine to use a reverse-link shared channel based on recognition that the device is being served by the FEMTO AP. In another embodiment, based on its serving FEMTO AP status, the wireless communications device can (i) modify its participation level in the communication session and/or (ii) selectively track usage. In another embodiment, the wireless communications device or FEMTO AP can measure performance parameters of the communication session to determine whether to trigger a handoff of the wireless communications device to a different AP.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which:

FIG. 8D illustrates another process of evaluating application-layer performance parameters when making handoff decisions in accordance with an embodiment of the invention.

DETAILED DESCRIPTION

Figure 1:
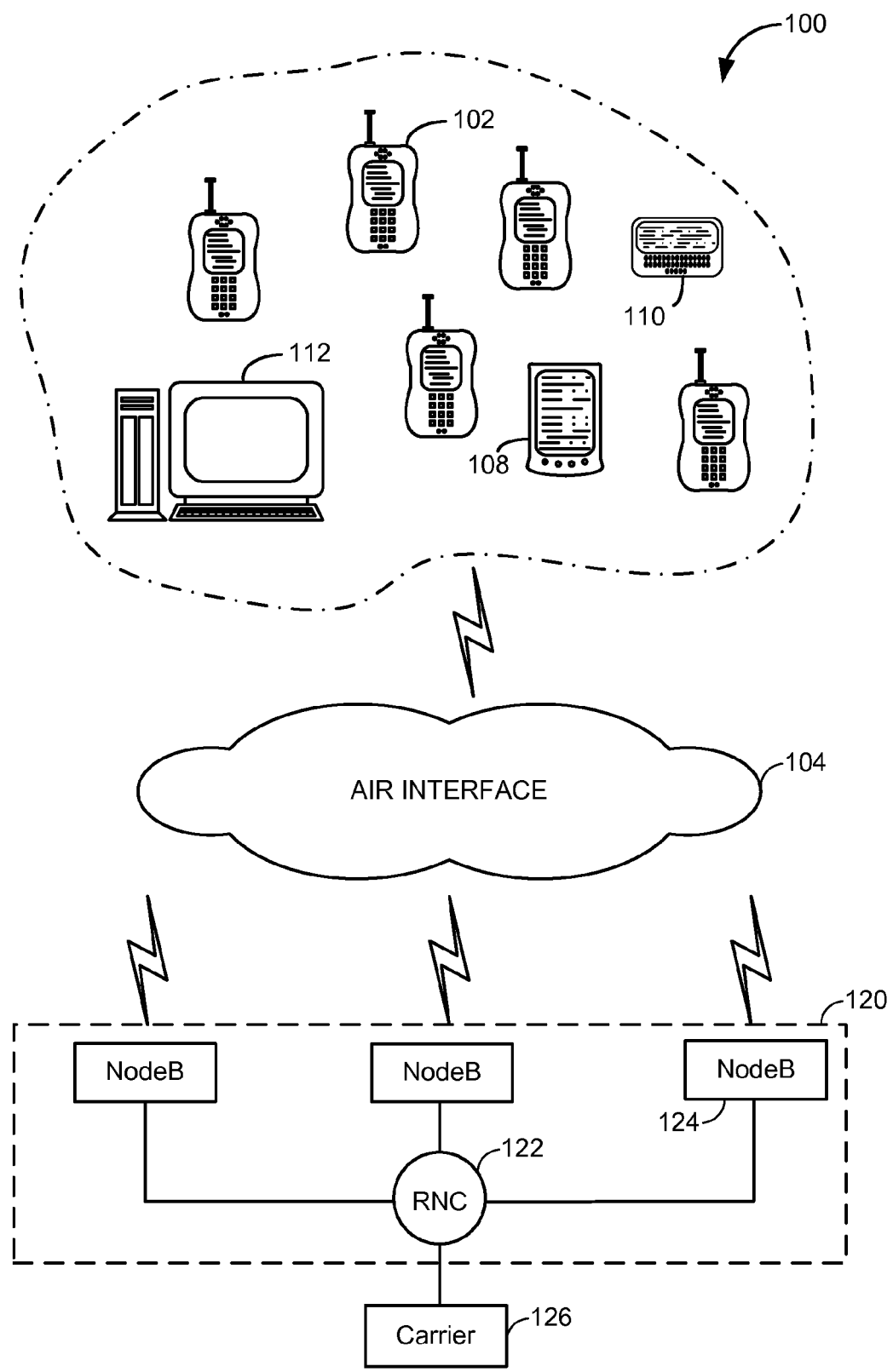
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as a user equipment (UE), may be mobile or stationary, and may communicate with one or more access points (APs), which may be referred to as Node Bs. A UE transmits and receives data packets through one or more of the Node Bs to a Radio Network Controller (RNC). The Node Bs and RNC are parts of a network called a radio access network (RAN). A radio access network can transport voice and data packets between multiple access terminals.

The radio access network may be further connected to additional networks outside the radio access network, such core network including specific carrier related servers and devices and connectivity to other networks such as a corporate intranet, the Internet, public switched telephone network (PSTN), a Serving General Packet Radio Services (GPRS) Support Node (SGSN), a Gateway GPRS Support Node (GGSN), and may transport voice and data packets between each UE and such networks. A UE that has established an active traffic channel connection with one or more Node Bs may be referred to as an active UE, and can be referred to as being in a traffic state. A UE that is in the process of establishing an active traffic channel (TCH) connection with one or more Node Bs can be referred to as being in a connection setup state. A UE may be any data device that communicates through a wireless channel or through a wired channel.

A UE may further be any of a number of types of devices including but not limited to PC card, compact flash device, external or internal modem, or wireless or wireline phone. The communication link through which the UE sends signals to the Node B(s) is called an uplink channel (e.g., a reverse traffic channel, a control channel, an access channel, etc.). The communication link through which Node B(s) send signals to a UE is called a downlink channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a block diagram of one exemplary embodiment of a wireless communications system 100 in accordance with at least one embodiment of the invention. System 100 can contain UEs, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or core network 126) and the UEs 102, 108, 110, 112. As shown here, the UE can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the term "UE" in other communication protocols (i.e., other than W-CDMA) may be referred to interchangeably as an "access terminal", "AT", "wireless device", "client device", "mobile terminal", "mobile station" and variations thereof.

Referring back to FIG. 1, the components of the wireless communications system 100 and interrelation of the elements of the exemplary embodiments of the invention are not limited to the configuration illustrated. System 100 is merely exemplary and can include any system that allows remote UEs, such as wireless client computing devices 102, 108, 110, 112 to communicate over-the-air between and among each other and/or between and among components connected via the air interface 104 and RAN 120, including, without limitation, core network 126, the Internet, PSTN, SGSN, GGSN and/or other remote servers.

The RAN 120 controls messages (typically sent as data packets) sent to a RNC 122. The RNC 122 is responsible for signaling, establishing, and tearing down bearer channels (i.e., data channels) between a Serving General Packet Radio Services (GPRS) Support Node (SGSN) and the UEs 102/108/110/112. If link layer encryption is enabled, the RNC 122 also encrypts the content before forwarding it over the air interface 104. The function of the RNC 122 is well-known in the art and will not be discussed further for the sake of brevity. The core network 126 may communicate with the RNC 122 by a network, the Internet and/or a public switched telephone network (PSTN). Alternatively, the RNC 122 may connect directly to the Internet or external network. Typically, the network or Internet connection between the core network 126 and the RNC 122 transfers data, and the PSTN transfers voice information. The RNC 122 can be connected to multiple Node Bs 124. In a similar manner to the core network 126, the RNC 122 is typically connected to the Node Bs 124 by a network, the Internet and/or PSTN for data transfer and/or voice information. The Node Bs 124 can broadcast data messages wirelessly to the UEs, such as cellular telephone 102. The Node Bs 124, RNC 122 and other components may form the RAN 120, as is known in the art. However, alternate configurations may also be used and the invention is not limited to the configuration illustrated. For example, in another embodiment the functionality of the RNC 122 and one or more of the Node Bs 124 may be collapsed into a single "hybrid" module having the functionality of both the RNC 122 and the Node B(s) 124.

Figure 2A:
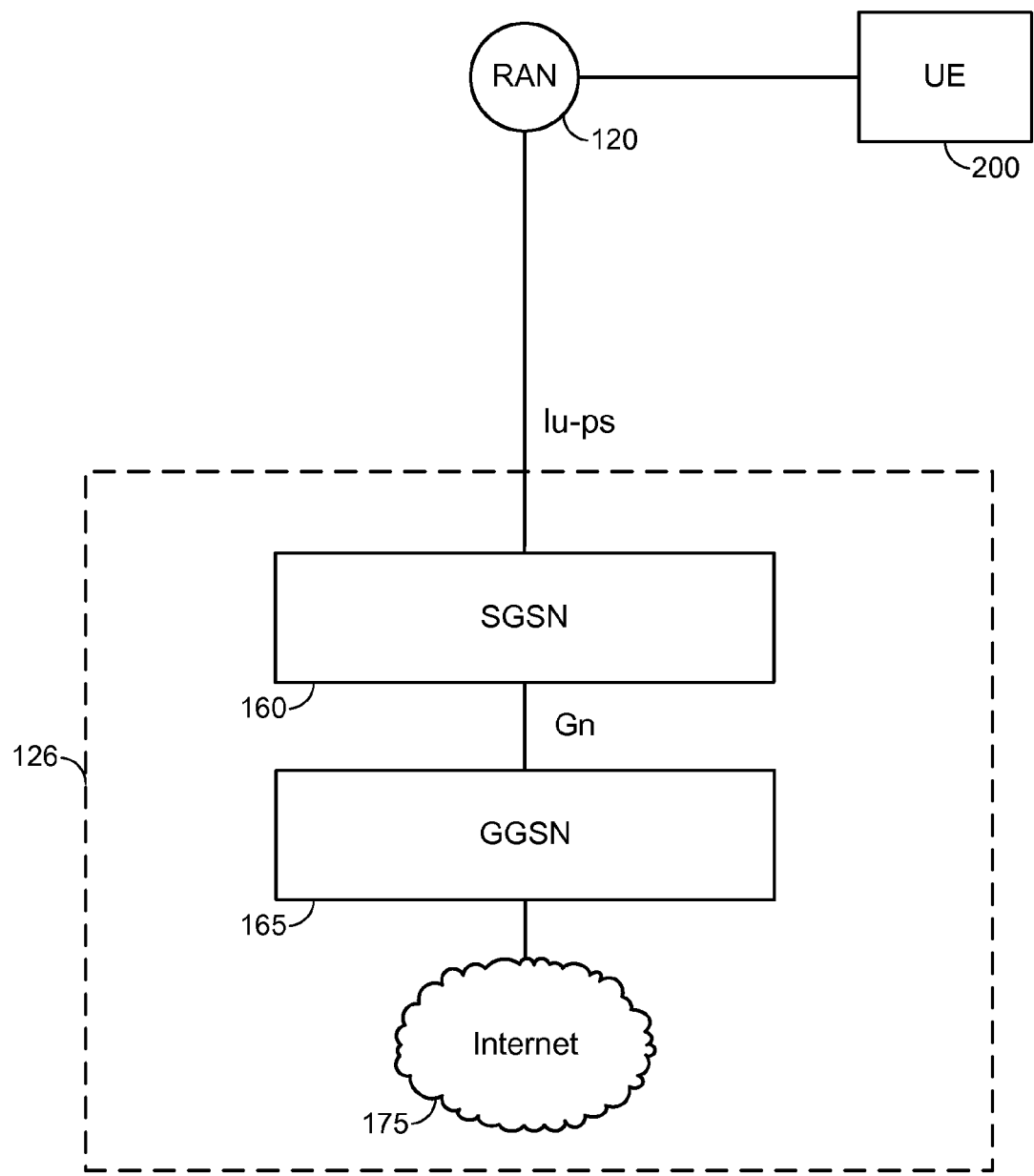
FIG. 2A illustrates the core network of FIG. 1 according to an embodiment of the present invention.

FIG. 2A illustrates the core network 126 according to an embodiment of the present invention. In particular, FIG. 2A illustrates components of a General Packet Radio Services (GPRS) core network implemented within a W-CDMA system. In the embodiment of FIG. 2A, the core network 126 includes a Serving GPRS Support Node (SGSN) 160, a Gateway GPRS Support Node (GGSN) 165 and an Internet 175. However, it is appreciated that portions of the Internet 175 and/or other components may be located outside the core network in alternative embodiments.

Generally, GPRS is a protocol used by Global System for Mobile communications (GSM) phones for transmitting Internet Protocol (IP) packets. The GPRS Core Network (e.g., the GGSN 165 and one or more SGSNs 160) is the centralized part of the GPRS system and also provides support for W-CDMA based 3G networks. The GPRS core network is an integrated part of the GSM core network, provides mobility management, session management and transport for IP packet services in GSM and W-CDMA networks.

The GPRS Tunneling Protocol (GTP) is the defining IP protocol of the GPRS core network. The GTP is the protocol which allows end users (e.g., access terminals) of a GSM or W-CDMA network to move from place to place while continuing to connect to the internet as if from one location at the GGSN 165. This is achieved transferring the subscriber's data from the subscriber's current SSGN 160 to the GGSN 165, which is handling the subscriber's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2A, the GGSN 165 acts as an interface between the GPRS backbone network (not shown) and the external packet data network 175. The GGSN 165 extracts the packet data with associated packet data protocol (PDP) format (e.g., IP or PPP) from the GPRS packets coming from the SGSN 160, and sends the packets out on a corresponding packet data network. In the other direction, the incoming data packets are directed by the GGSN 165 to the SGSN 160 which manages and controls the Radio Access Bearer (RAB) of the destination UE served by the RAN 120. Thereby, the GGSN 165 stores the current SGSN address of the target UE and his/her profile in its location register (e.g., within a PDP context). The GGSN is responsible for IP address assignment and is the default router for the connected UE. The GGSN also performs authentication and charging functions.

The SGSN 160 is representative of one of many SGSNs within the core network 126, in an example. Each SGSN is responsible for the delivery of data packets from and to the UEs within an associated geographical service area. The tasks of the SGSN 160 includes packet routing and transfer, mobility management (e.g., attach/detach and location management), logical link management, and authentication and charging functions. The location register of the SGSN stores location information (e.g., current cell, current VLR) and user profiles (e.g., IMSI, PDP address(es) used in the packet data network) of all GPRS users registered with the SGSN 160, for example, within one or more PDP contexts for each user or UE. Thus, SGSNs are responsible for (i) de-tunneling downlink GTP packets from the GGSN 165, (ii) uplink tunnel IP packets toward the GGSN 165, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in Universal Mobile Telecommunications System (UMTS) system architecture) communicates with the SGSN 160 via a Iu interface, with a transmission protocol such as Frame Relay or IP. The SGSN 160 communicates with the GGSN 165 via a Gn interface, which is an IP-based interface between SGSN 160 and other SGSNs (not shown) and internal GGSNs, and uses the GTP protocol defined above (e.g., GTP-U, GTP-C, GTP', etc.). While not shown in FIG. 2A, the Gn interface is also used by the Domain Name System (DNS). The GGSN 165 is connected to a Public Data Network (PDN) (not shown), and in turn to the Internet 175, via a Gi interface with IP protocols either directly or through a Wireless Application Protocol (WAP) gateway.

The PDP context is a data structure present on both the SGSN 160 and the GGSN 165 which contains a particular UE's communication session information when the UE has an active GPRS session. When a UE wishes to initiate a GPRS communication session, the UE must first attach to the SGSN 160 and then activate a PDP context with the GGSN 165. This allocates a PDP context data structure in the SGSN 160 that the subscriber is currently visiting and the GGSN 165 serving the UE's access point.

Figure 2B:
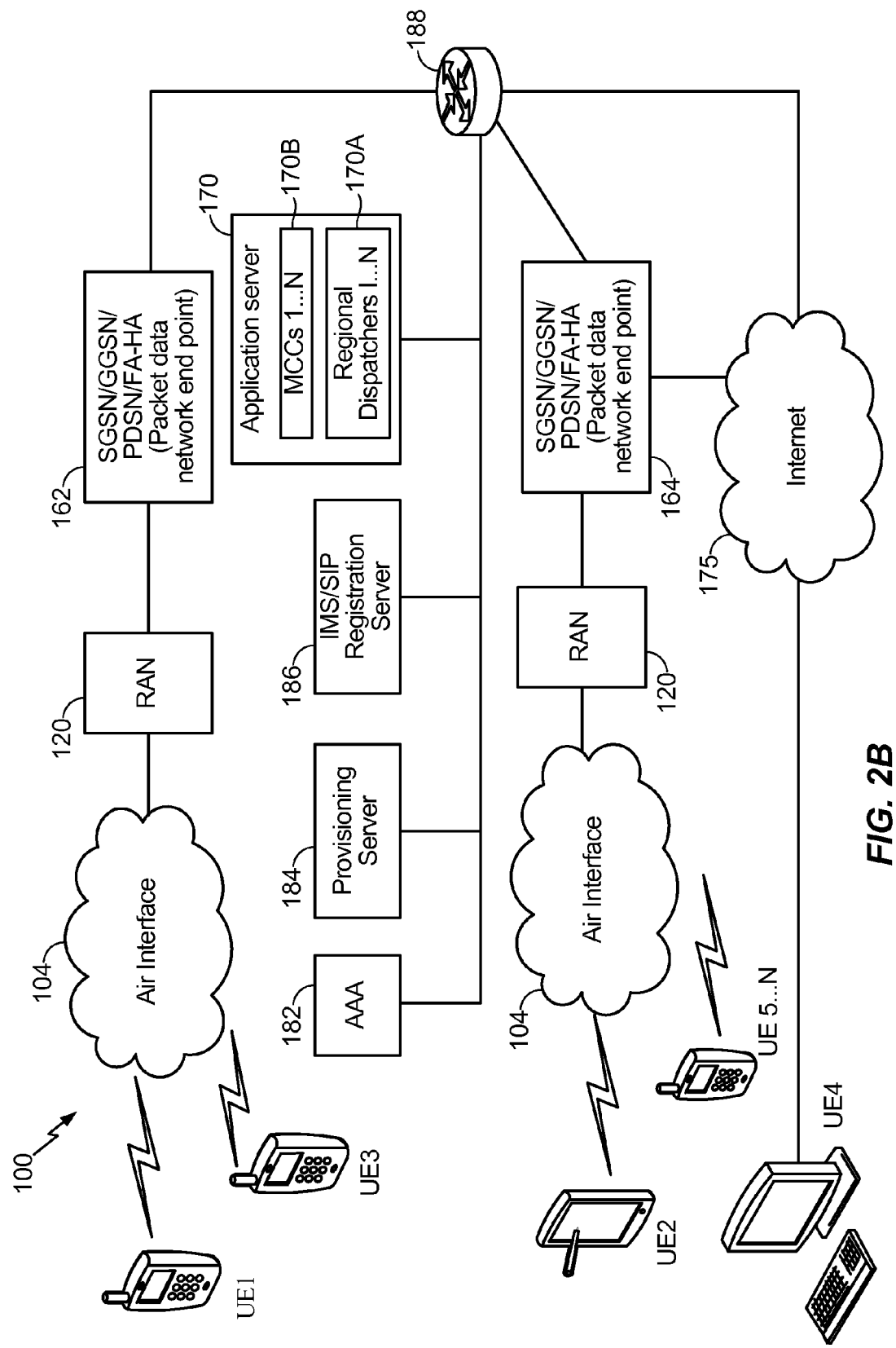
FIG. 2B illustrates an example of the wireless communications system 100 of FIG. 1 in more detail.

FIG. 2B illustrates an example of the wireless communications system 100 of FIG. 1 in more detail. In particular, referring to FIG. 2B, UEs 1 . . . N are shown as connecting to the RAN 120 at locations serviced by different packet data network end-points. The illustration of FIG. 2B is specific to W-CDMA systems and terminology, although it will be appreciated how FIG. 2B could be modified to confirm with a 1x EV-DO system. Accordingly, UEs 1 and 3 connect to the RAN 120 at a portion served by a first packet data network end-point 162 (e.g., which may correspond to SGSN, GGSN, PDSN, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. UEs 2 and 5 . . . N connect to the RAN 120 at a portion served by a second packet data network end-point 164 (e.g., which may correspond to SGSN, GGSN, PDSN, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. UE 4 connects directly to the Internet 175, and through the Internet 175 can then connect to any of the system components described above.

Referring to FIG. 2B, UEs 1, 3 and 5 . . . N are illustrated as wireless cell-phones, UE 2 is illustrated as a wireless tablet-PC and UE 4 is illustrated as a wired desktop station. However, in other embodiments, it will be appreciated that the wireless communication system 100 can connect to any type of UE, and the examples illustrated in FIG. 2B are not intended to limit the types of UEs that may be implemented within the system. Also, while the AAA server 182, the provisioning server 184, the IMS/SIP registration server 186 and the application server 170 are each illustrated as structurally separate servers, one or more of these servers may be consolidated in at least one embodiment of the invention.

Further, referring to FIG. 2B, the application server 170 is illustrated as including a plurality of media control complexes (MCCs) 1 . . . N 170B, and a plurality of regional dispatchers 1 . . . N 170A. Collectively, the regional dispatchers 170A and MCCs 170B are included within the application server 170, which in at least one embodiment can correspond to a distributed network of servers that collectively functions to arbitrate communication sessions (e.g., half-duplex group communication sessions via IP unicasting and/or IP multicasting protocols) within the wireless communication system 100. For example, because the communication sessions arbitrated by the application server 170 can theoretically take place between UEs located anywhere within the system 100, multiple regional dispatchers 170A and MCCs are distributed to reduce latency for the arbitrated communication sessions (e.g., so that a MCC in North America is not relaying media back-and-forth between session participants located in China). Thus, when reference is made to the application server 170, it will be appreciated that the associated functionality can be enforced by one or more of the regional dispatchers 170A and/or one or more of the MCCs 170B. The regional dispatchers 170A are generally responsible for any functionality related to establishing a communication session (e.g., handling signaling messages between the UEs, scheduling and/or sending announce messages, etc.), whereas the MCCs 170B are responsible for hosting the communication session for the duration of the call instance, including conducting an in-call signaling and an actual exchange of media during an arbitrated communication session.

Figure 2C:
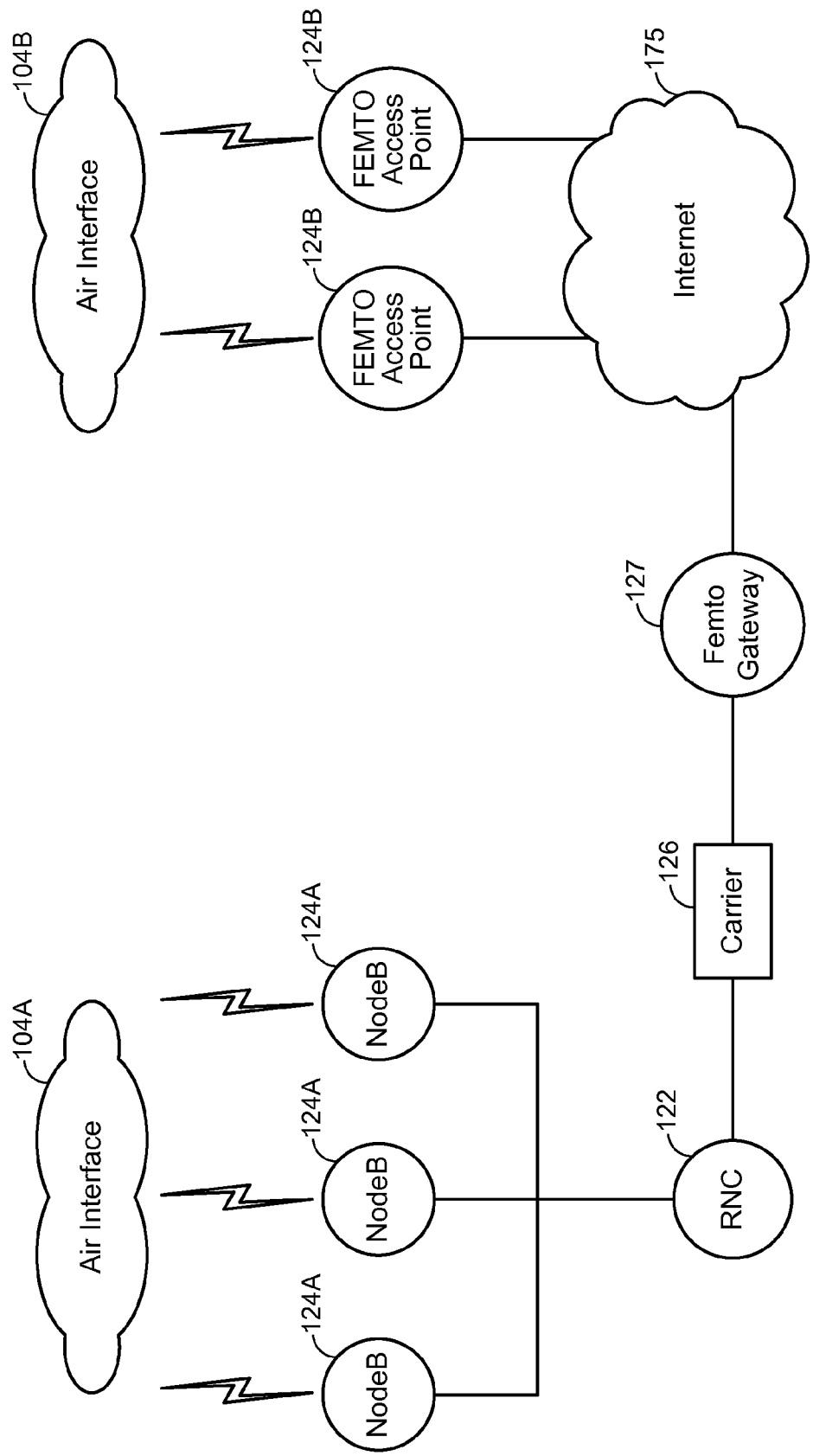
FIG. 2C illustrates the RAN-portion of the core network of FIG. 1 that is expanded to include a plurality of FEMTO access points (APs) that connect to the RNC through the Internet in accordance with an embodiment of the invention.

FIG. 2C illustrates another alternative example of the wireless communications system 100 of FIG. 1 in more detail. Referring to FIG. 2C, the Node Bs 124 from FIG. 1 are represented as either Node Bs 124A or FEMTO Access Points (APs) 124B. Node Bs 124A correspond to 'macro-cells', 'macro-APs' or base stations (e.g., cell-towers) that operate in accordance with a given communications protocol (e.g., 1x, EV-DO, W-CDMA) and serve a relatively large serving area. For example, an order of magnitude of the serving area of a macro-AP or Node B 124A may correspond to miles from the antenna(s) at the Node B 124A. The Node Bs 124A are connected to the RNC 122 via a typical wired cellular backhaul infrastructure.

Referring to FIG. 2C, FEMTO APs 124B correspond to FEMTO cells. The FEMTO APs 124B operate in accordance with the same communications protocol (e.g., 1x, EV-DO, W-CDMA) as the macro-APs or Node Bs 124A. In other words, the FEMTO APs 124B transmit the same type of pilot signal as the macro-APs or Node Bs 124A, are configured to conform with the same signaling messages as the macro-APs or Node Bs 124A, and so on.

However, the FEMTO APs support functionality of Node Bs 124 and also a part of the RNC 122. The remaining functionality of RNC 122 for connecting to the Carrier 126 is supported by the FEMTO gateway 127. The FEMTO APs 124B are connected to the FEMTO gateway 127 via the internet 175 instead of the more typical wired cellular backhaul infrastructure. Also, the FEMTO APs 124B cover a smaller serving area as compared to the macro-APs or Node Bs 124A. For example, the Node Bs 124A can correspond to cell towers that are spread a few miles apart and are collectively configured to provide seamless coverage throughout a particular geographic area. The FEMTO APs 124B, on the other hand, are more localized in nature (e.g., covering a radius of approximately 50 meters, 100 meters, 400 meters, etc., as opposed to providing many miles of coverage) and are configured to provide a relatively high amount of bandwidth in a smaller or more focused geographic area. For example, FEMTO APs 124B can correspond to indoor base stations, in an example, that provide a high-level of performance within a particular building (e.g., a residential house, an office building, etc.). It will further be appreciated that, due to the relative size of their respective serving areas, the UEs served by the FEMTO APs 124B will generally be closer to their serving Node B than the UEs served by one of the macro-APs or Node Bs 124A.

In an example, the FEMTO APs 124B can be implemented as wireless routers with high-speed wired connections to the Internet 175 (e.g., such as a DSL connection, cable internet connection, an optical internet connection such as FiOS, etc.). As mentioned above, however, instead of implementing a wireless communications protocol that is common for Internet-connected WiFi routers (e.g., such as 802.11a, 802.11b, etc.), the FEMTO APs 124B conform to the same wireless communications protocol (e.g., a 'cellular' communications protocol, such as 1x, EV-DO, UMTS, etc.) as the macro-APs or Node Bs 124A. Accordingly, a UE monitoring pilot signals of Node Bs will generally not be able to differentiate a pilot of a macro-AP or Node B 124A from a pilot of a FEMTO AP.

Also, because FEMTO APs 124B provide service within a relatively limited area, a given FEMTO AP 124B will typically serve fewer UEs than a macro-AP or Node B 124A, and will thereby be expected to provide high-quality service to its UEs in most cases. For this reason, fewer UEs would be expected to contend for resources over the wireless air interface 104B to FEMTO APs 124B as opposed to the wireless air interface 104A to Node Bs 124A. Accordingly, a higher level of bandwidth can normally be achieved over air interface 104B as compared to air interface 104A.

However, it will also be appreciated that the FEMTO APs 124B are more susceptible to conditions on the Internet 175 through which FEMTO APs connect to the FEMTO gateway 127, whereas the Node Bs 124A have a more direct connection to RNC 122. In other words, only cellular subscribers will typically be provided service through Node Bs 124A to the RNC 122, whereas connections through the Internet 175 are shared with any user that can connect to the Internet 175, and is not limited to cellular subscribers. Thus, it will be appreciated that the Node Bs 124A are typically limited or bottlenecked by the air interface 104A to their served UEs, whereas the FEMTO APs 124B are typically limited or bottlenecked by their connection to the Internet 175.

Figure 3:
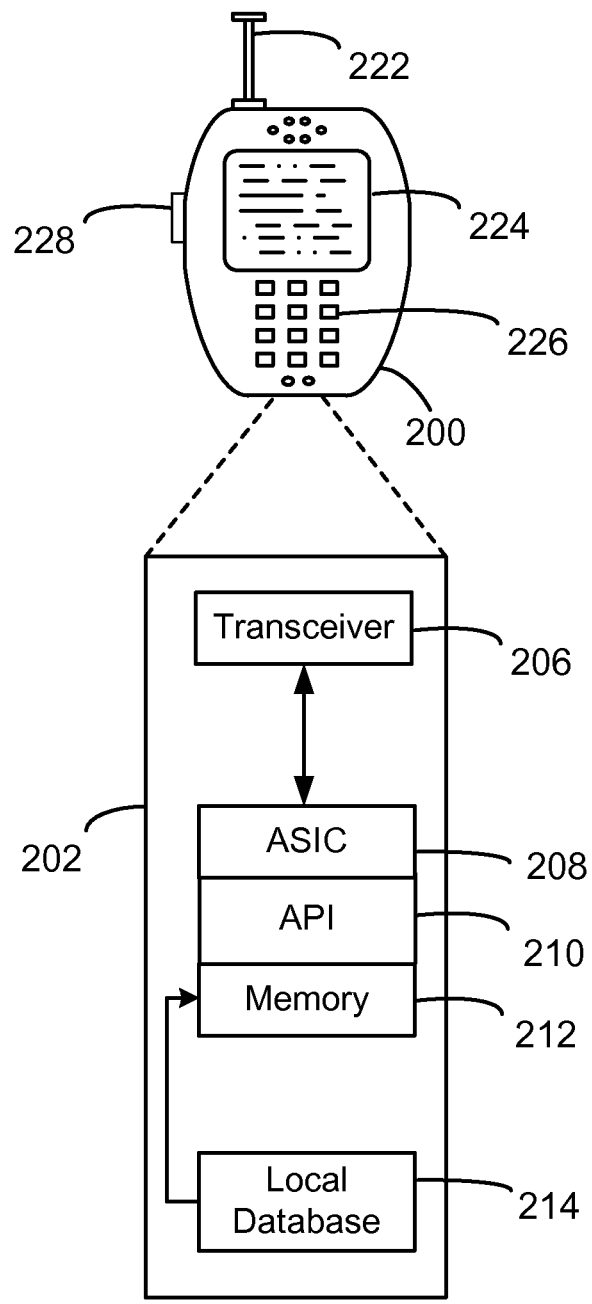
FIG. 3 is an illustration of an access terminal in accordance with at least one embodiment of the invention.

Referring to FIG. 3, a UE 200, (here a wireless device), such as a cellular telephone, has a platform 202 that can receive and execute software applications, data and/or commands transmitted from the RAN 120 that may ultimately come from the core network 126, the Internet and/or other remote servers and networks. The platform 202 can include a transceiver 206 operably coupled to an application specific integrated circuit (ASIC) 208, or other processor, microprocessor, logic circuit, or other data processing device. The ASIC 208 or other processor executes the application programming interface (API) 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include a UE including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UE 200 in FIG. 3 are to be considered merely illustrative and the invention is not limited to the illustrated features or arrangement.

The wireless communication between the UE 102 or 200 and the RAN 120 can be based on different technologies, such as code division multiple access (CDMA), W-CDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. For example, in W-CDMA, the data communication is typically between the client device 102, Node B(s) 124, and the RNC 122. The RNC 122 can be connected to multiple data networks such as the core network 126, PSTN, the Internet, a virtual private network, a SGSN, a GGSN and the like, thus allowing the UE 102 or 200 access to a broader communication network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 4:
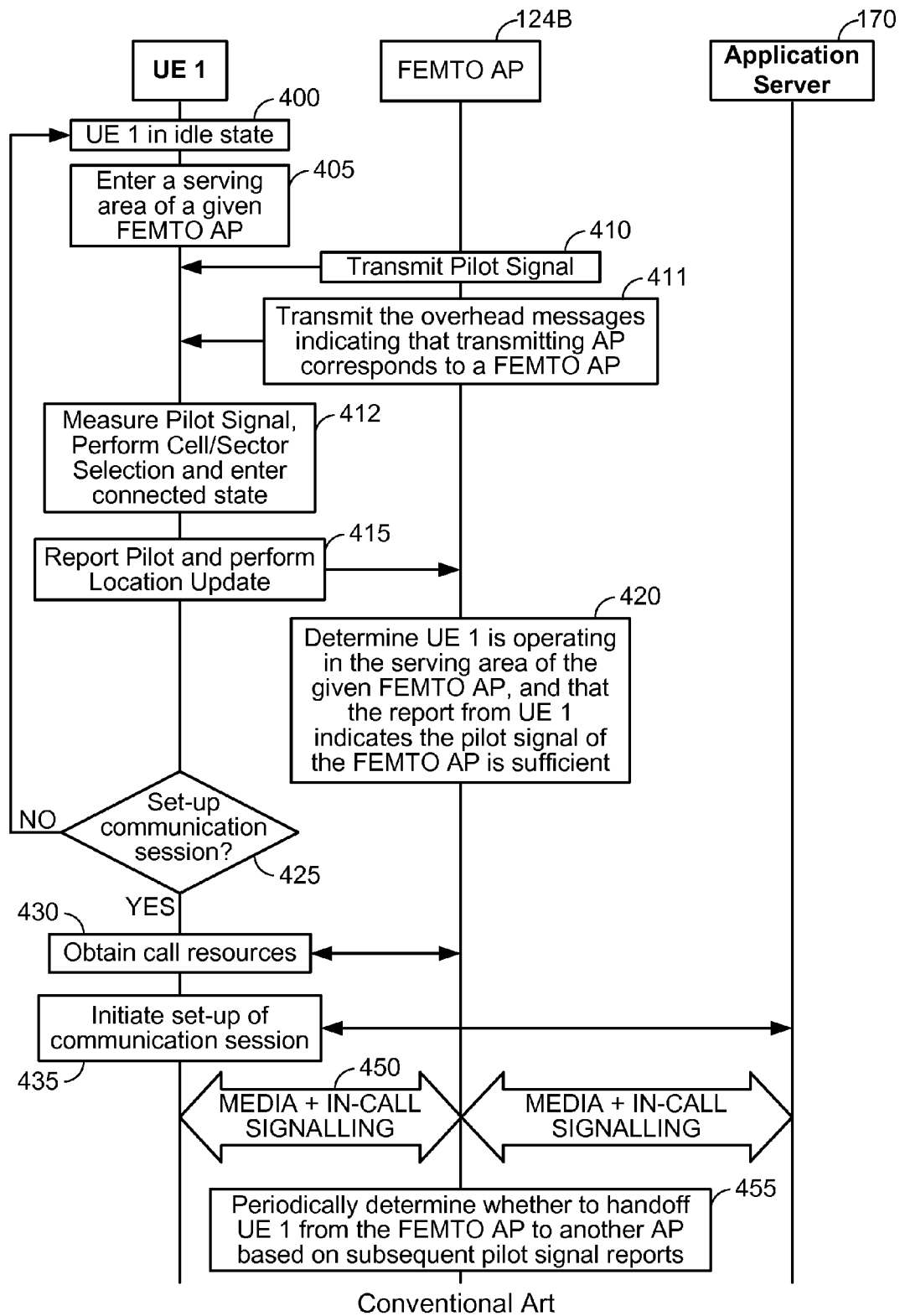
FIG. 4 illustrates a conventional process illustrating FEMTO AP-behavior within a wireless communication system.

FIG. 4 illustrates a conventional process illustrating FEMTO AP-behavior within a wireless communication system. Referring to FIG. 4, assume that a given UE ("UE 1") is in an idle state, 400. In this case, being in an 'idle' state means that UE 1 is not actively participating in a communication session and does not have a TCH, although UE 1 may have established a PDP context. Next, UE 1 enters a serving area of a given FEMTO AP, 405. In an example, UE 1's entry into the given FEMTO AP's serving area can correspond to UE 1 powering-up in proximity to the given FEMTO AP, or alternatively can correspond to a handoff of UE 1 from another Node B (e.g., either a macro-AP or another FEMTO AP) to the given FEMTO AP.

Referring to FIG. 4, the given FEMTO AP serving UE 1 transmits a periodic pilot signal on a downlink channel, 410. The FEMTO AP also transmits the overhead messages containing an indication on whether the serving Node B is a FEMTO AP periodically on a downlink channel, 411. For example, the overhead message transmitted in 411 can correspond to a System Information Broadcast 20 message in W-CDMA networks, or an Access Point Identification message in CDMA2000 networks. In 412, UE 1 measures performance characteristics of the periodic pilot signal (e.g., a signal-to-interference ratio (SIR), etc.), performs cell/sector selection and enters a connected state. UE 1 then reports the measured performance characteristics of the periodic pilot signal to UE 1's serving FEMTO AP, 415. The FEMTO AP receives the pilot signal measurement report and determines that UE 1 is operating in the serving area of the given FEMTO AP, and also determines whether a handoff of UE 1 to another Node B is required, 420. For example, the pilot signal measurement report can include measurements related to the FEMTO AP's pilot signal and also pilot signals of neighboring APs or Node Bs, with the FEMTO AP responsible for transitioning UE 1 to a serving Node B based in part on the pilot signal measurement report (and also based in part on the loading on the individual Node Bs and/or other criteria). In 420, assume that the FEMTO AP determines not to instruct UE 1 to perform a handoff.

Next, assume that blocks 405 through 420 repeat at a given interval, and that UE 1 remains served by the FEMTO AP such that no handoff of UE 1 to another Node B is performed. In 425, UE 1 determines whether to initiate a communication session. If UE 1 determines not to initiate a communication session in 425, the process returns to 400 and the iterative process of blocks 405 through 420 continues. Otherwise, if UE 1 determines to initiate a communication session in 425 (e.g., a user of UE 1 presses a CALL button or PTT button on UE 1, UE 1 receives a page from the FEMTO AP 124B and determines to answer the page, etc.), UE 1 obtains call resources in 430. For example, block 430 can correspond to UE 1 obtaining a TCH and/or Quality of Service (QoS) resources.

After obtaining call resources in 430, UE 1 initiates set-up of the communication session to be arbitrated by the application server 170, 435. For example, in 435, UE 1 can transmit a call message to the application server 170 (e.g., through the FEMTO AP, Internet 175 and RNC 122), in response to which the application server 170 sets-up the communication session.

Accordingly, UE 1 participates in the communication session arbitrated by the application server 170 and sends and/or receives media and in-call signaling messages with the application server, 450. While not shown in FIG. 4, the communication session can also be joined by one or more other UEs. During the communication session, the FEMTO AP 124B periodically determines whether to hand UE 1 off from the FEMTO AP to another FEMTO AP 124B or a Node B 124A based in part on subsequent pilot signal measurement reports (not shown), loading conditions on the FEMTO AP or neighboring APs, and/or other criteria, 455.

As will be appreciated from a review of FIG. 4, conventionally, when a given UE is idle and hands off from one Node B to another Node B in the wireless communication session 100, the UE receives indication of whether the serving Node B is a FEMTO AP from the broadcasted overhead messages. However, the given user of the UE is not notified and remains unaware with regard to whether the given UE is currently served by a FEMTO AP or a macro-AP. Accordingly, the user of the UE is not necessarily notified of certain features available in a FEMTO AP's coverage area, such as lower charging rates, higher-bandwidth Quality of Service (QoS) and/or other features. Also, because charging rates are usually different between FEMTO APs and macro APs and UE 1 can be handed off to/from FEMTO APs and/or macro APs during a particular communication session, it can be difficult for a user of UE 1 to track his/her usage for the communication session.

Figure 5:
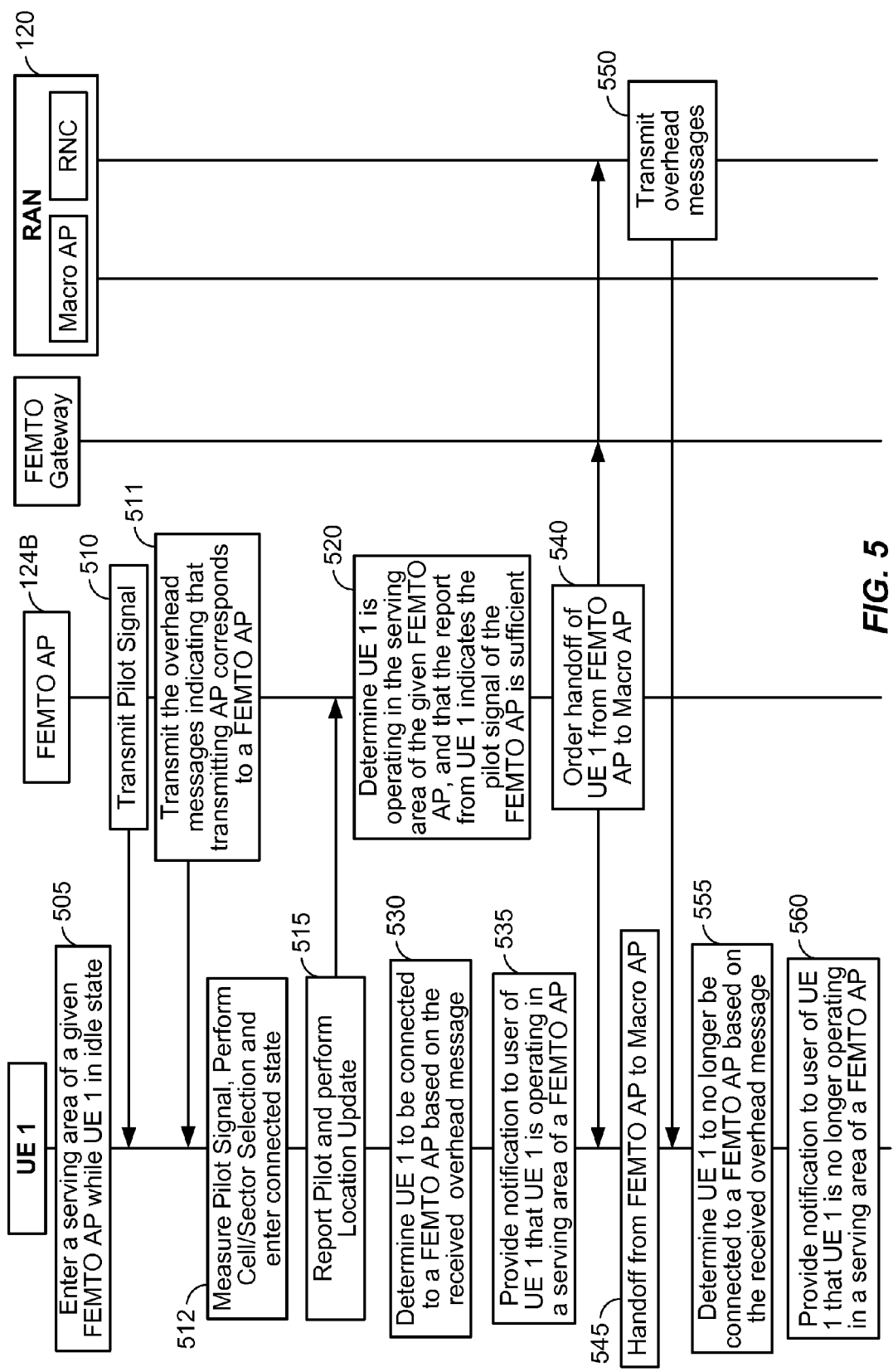
FIG. 5 is directed to a process of informing a given user of UE of whether the given UE is in a service area of a FEMTO AP in accordance with an embodiment of the invention.

Accordingly, FIG. 5 is directed to a process of informing a given UE ("UE 1") of whether UE 1 is in a service area of a FEMTO AP in accordance with an embodiment of the invention. Referring to FIG. 5, 505 through 520 generally correspond to 405 through 420 of FIG. 4, respectively, and as such will not be described further for the sake of brevity.

In 530, UE 1 receives the overhead message and determines that it is connected to a FEMTO AP. Next, UE 1 provides a notification to its user indicating that UE 1 is currently operating in a serving area of a FEMTO AP, 535. For example, the notification of 535 can correspond to an audio alert, a graphic alert, a vibration and/or any other mechanism by which a user of UE 1 can be informed of the status of UE 1's current cell. As will be appreciated, the notification of 535 can occur while UE 1 is still idle (i.e., while a user of UE 1 is not engaged in a communication session through UE 1).

As will be appreciated, a user of UE 1 can modify his/her behavior based on the notification that UE 1 is operating in a serving area of a FEMTO AP. For example, the user of UE 1 may be informed that FEMTO APs have higher bandwidth and/or QoS characteristics, and can determine to initiate a resource intensive communication session (e.g., a video conference, the download or upload of a large data file, etc.) that the user would otherwise not engage in based on the FEMTO AP-notification from 535. In another example, the user of UE 1 may be informed that FEMTO APs have lower charging rates (e.g., free or cheaper calls, calls that do not count against a given number of 'minutes' in the user's calling plan, etc.), such that the user of UE 1 will engage in communication sessions that the user would otherwise not enter into due to costs.

At some later point in time, assume that the FEMTO AP 124B determines that UE 1 requires a handoff from its current, serving FEMTO AP to another Node B (e.g., such as a macro AP in this example, although theoretically UE 1 could be handed off from its current serving FEMTO AP to another FEMTO AP). Accordingly, the FEMTO AP 124B facilitates the handoff of UE 1 from its current serving FEMTO AP to a new Node B (e.g., a macro AP, in this example) by sending messages to (i) UE 1 and (ii) the serving RNC 122, 540.

Accordingly, UE 1 hands off from the FEMTO AP to the macro AP in 545. Next, after the handoff, the macro AP now serving UE 1 does not transmit the 'configured' overhead messages transmitted in 511 by the FEMTO AP 124B (in other words, the macro AP does not identify itself as a FEMTO AP). The macro AP transmits the remaining overhead messages, 550. Accordingly, UE 1 does not receive the FEMTO AP specific overhead message from the macro AP and determines that UE 1 is no longer connected to a FEMTO AP, 555. At this point, UE 1 can provide a notification to its user indicating that UE 1 is no longer operating in a serving area of a FEMTO AP, 560. For example, the notification of 560 can correspond to an audio alert, a graphic alert, a vibration and/or any other mechanism by which a user of UE 1 can be informed of the non-FEMTO status of UE 1's current cell. As will be appreciated, the notification of 560 can occur while UE 1 is still idle (i.e., while a user of UE 1 is not engaged in a communication session through UE 1).

While FIG. 5 is described as if UE 1 navigates between serving areas of the FEMTO AP and macro AP while remaining in idle mode, it will be appreciated that UE 1 could, at any point of the process of FIG. 5, become engaged in an active communication session. In this case, UE 1 will still be informed with regard to whether UE 1 is operating in a FEMTO AP or macro AP at least through the overhead messages transmitted by the respective APs or Node Bs. In the event that UE 1 actively participates in a communication session, UE 1 and/or a user thereof can use its knowledge related to whether it is served by a FEMTO AP or macro AP to modify one or more aspects of the communication session.

Figure 6A:
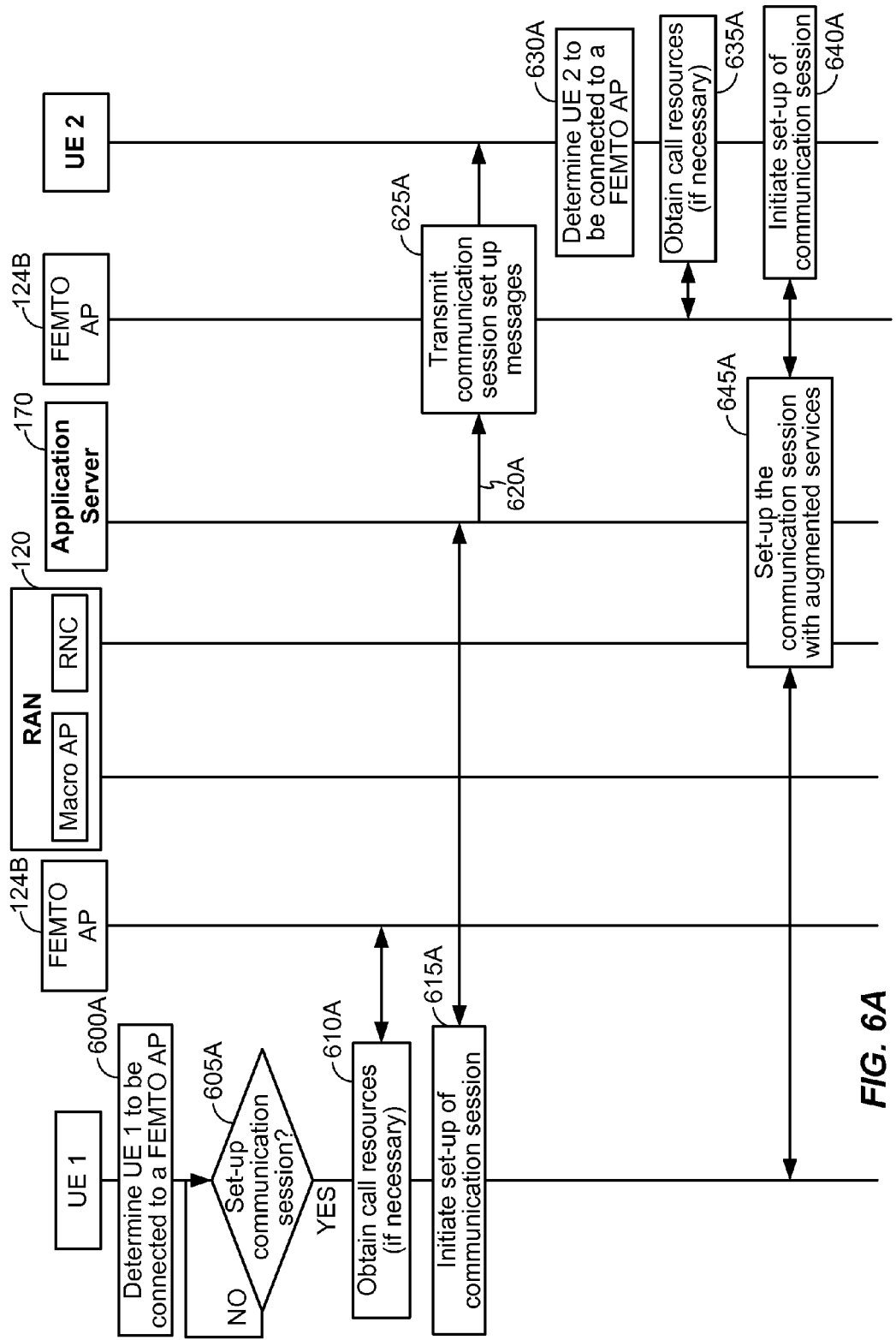
FIG. 6A illustrates a process of setting-up a server-arbitrated communication session between UEs when the UEs are each being served by a FEMTO AP in accordance with an embodiment of the invention.
Figure 6B:
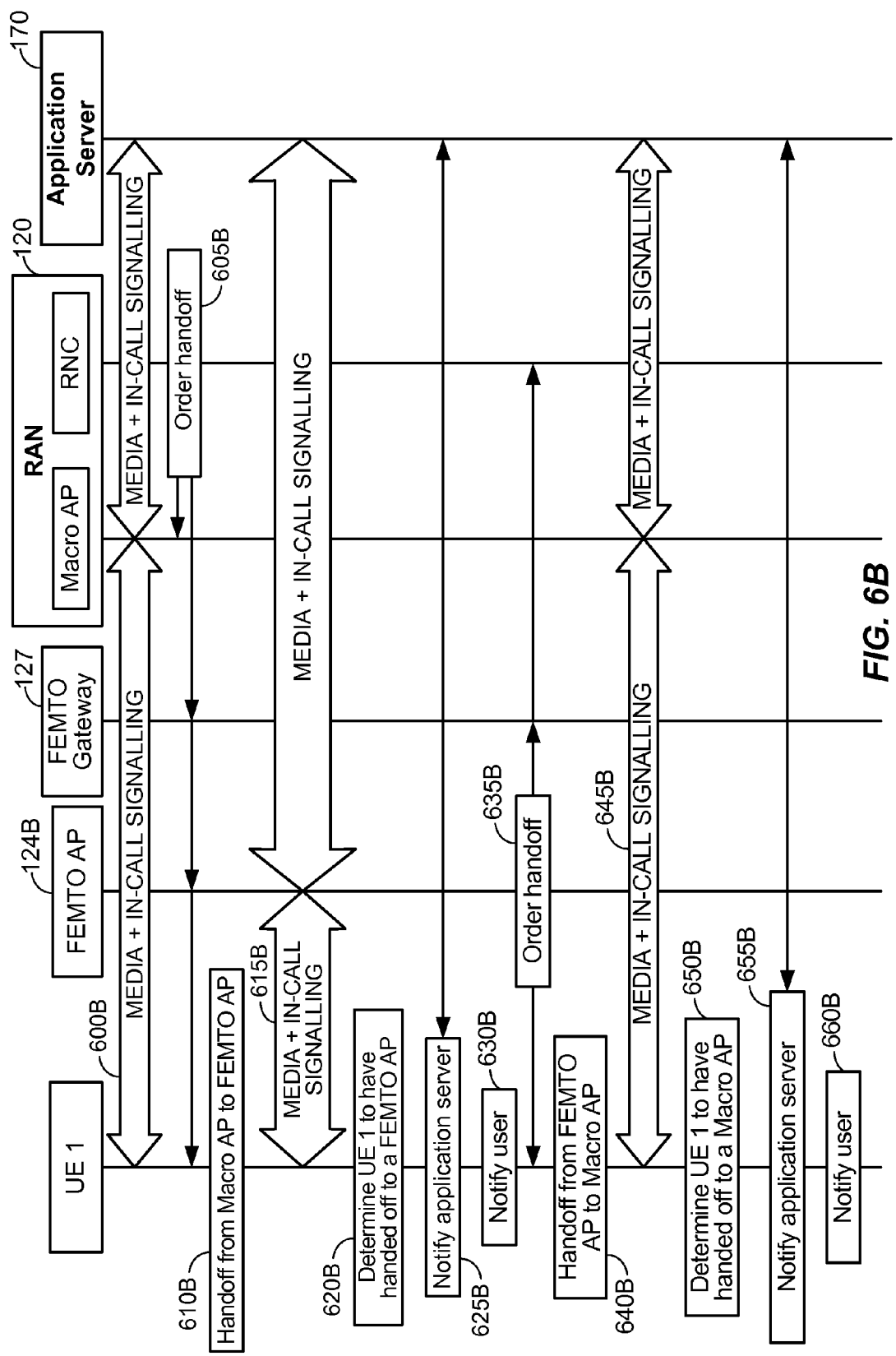
FIG. 6B illustrates a process whereby a given UE participating in a server-arbitrated communication session that is modified in part based on the given UE's handoffs between a FEMTO AP and macro AP in accordance with an embodiment of the invention.

Accordingly, FIG. 6A illustrates an example of setting-up a server-arbitrated communication session between UEs 1 and 2 when UEs 1 and 2 are each being served by a FEMTO AP in accordance with an embodiment of the invention, and FIG. 6B illustrates an example of UE 1 participating in a server-arbitrated communication session that is modified in part based on UE 1's handoffs between a FEMTO AP and macro AP in accordance with an embodiment of the invention.

Referring to FIG. 6A, assume that UE 1 determines itself to be connected to, or in a serving area of, a FEMTO AP, 600A. For example, the determination of 600A can correspond to the decoding of an overhead message transmitted by the FEMTO AP as in 530 of FIG. 5. While still connected to the FEMTO AP, UE 1 determines whether to set-up a communication session to be arbitrated by the application server 170, 605A. If UE 1 determines not to initiate a communication session in 605A, UE 1 remains in an idle state. Otherwise, if UE 1 determines to initiate a communication session in 605A (e.g., a user of UE 1 presses a CALL button or PTT button on UE 1, UE 1 receives a page or call announcement from the RAN 120 and determines to answer the page or answer the call announcement, etc.), UE 1 obtains call resources in 610A, if necessary.

In an embodiment of the invention, the step of obtaining call resources, such as a TCH upon which UE 1 can transmit, in 610A is optional because the air interface 104B used by FEMTO APs is generally shorter-range and thereby has fewer UEs contending for the same wireless resources as compared to a macro AP. Thus, if UE 1 knows that it is operating in a FEMTO AP before attempting to set-up a communication session, UE 1 can simply use a reverse link shared access channel as if this channel were its own TCH, in an example (e.g., at least for initial set-up messaging of a communication session). In other words, because the reverse link shared access channel is expected to be 'shared' by fewer UEs by virtue of UE 1's knowledge of operating in a FEMTO-cell, UE 1 can use the reverse link shared access channel by default during communication session set-up (e.g., to send a call message to the application server 170 before a TCH is set-up). For example, UE 1 can transmit the communication session set-up messages as mobile-originated (MO) data-over-signaling (DoS) messages on reverse-link access channel in 1xEV-DO networks, or transmit the communication session set-up messages on the random access channel (RACH) in WCDMA networks. Thus, the notification or determination of UE 1's presence in a FEMTO-cell can be used to trigger transmission of communication setup messages on common channels at least during communication set-up, which can result in quick set-up of the communication session as compared to waiting for a TCH to be allocated to UE 1 before sending a call message to the application server 170, in an example.

Accordingly, in 615A, UE 1 sets up its communication session with the application server 170 (e.g., by sending a call request message to the application server 170 in 615A). In the embodiment of FIG. 6A, one or more of the reverse-link messages sent by UE 1 to the application server 170 during the set-up of the communication session in 615A (e.g., either on the reverse link shared access channel, upon an obtained TCH, etc.) can be configured to convey, to the application server 170, that UE is operating in a FEMTO-cell. For example, the UE 1 can set a field or bit in the call message to indicate its presence in FEMTO AP coverage.

Upon receiving the call message in 615A from UE 1 instructing the application server 170 to set-up a communication session with UE 2, the application server 170 forwards call announce message to the FEMTO AP 124B serving UE 2, 620A. The FEMTO AP 124B serving UE 2 then transmits communication set-up messages on the forward-link or downlink control channel to UE 2, 625A. In an example, the messages transmitted from the FEMTO AP 124B to UE 2 in 625A can correspond to mobile-terminated (MT) DoS messages in EV-DO, such that the FEMTO AP 124B need not wait for a TCH to be set-up with UE 2 before transmitting the call announce message in an example. Alternatively, in W-CDMA, the message(s) in 625A can be transmitted on a forward access channel (FACH).

In 630A, UE 2 receives the call announce message and also determines that UE 2 is in a FEMTO AP-coverage area. In an example, the determination of 630A can occur prior to receipt of the announce message. Next, UE 2 optionally acquires call resources, 635A. Similar to 610A, 635A is optional because a shared channel can be used in a FEMTO AP without causing interference issues in an example. UE 2 then transmits a call accept message to the application server 170, 640A. UE 2 can also convey its FEMTO AP-coverage status to the application server 170 via the call accept message in 640A, in an example.

Next, when the application server 170 sets-up the communication session, the application server 170 can configure the communication session with augmented services based at least in part on the recognition that UEs 1 and 2 are operating in a FEMTO-cell, 645A.

For example, in 645A, if the communication session corresponds to an end-to-end call and application server 170 determines that UE 1 and UE 2 to the communication session are both operating in FEMTO-cells, then the application server 170 may augment parameters of the session from default session parameters. For example, in this case, the application server 170 could increase the resolution of the audio for the communication session at both ends of the session. For example, in 645A, if the communication session corresponds to an end-to-end concurrent voice and media call, if the participants are in FEMTO AP coverage (in-home multi-player gaming scenario), then the application server 170 could discover this capability during call setup and augment the capabilities for the call (i.e., transition from low resolution to a high resolution video file transfer). Similarly, when handoffs occur from the FEMTO AP to the Macro AP or from a Macro AP to FEMTO AP during a communication session, call capabilities can be modified suitably as described in FIG. 6B. When transitions occur between FEMTO AP and Macro AP, a tone could be played on the handset in addition to a UI notification change to inform the user of such handoff.

While FIG. 6A is related to set-up of a server-arbitrated communication session, in other embodiments an active communication session can be modified in accordance with whether a given UE ("UE 1") has handed off to, or away from, a FEMTO AP, as will be described with respect to FIG. 6B.

Figure 8A:
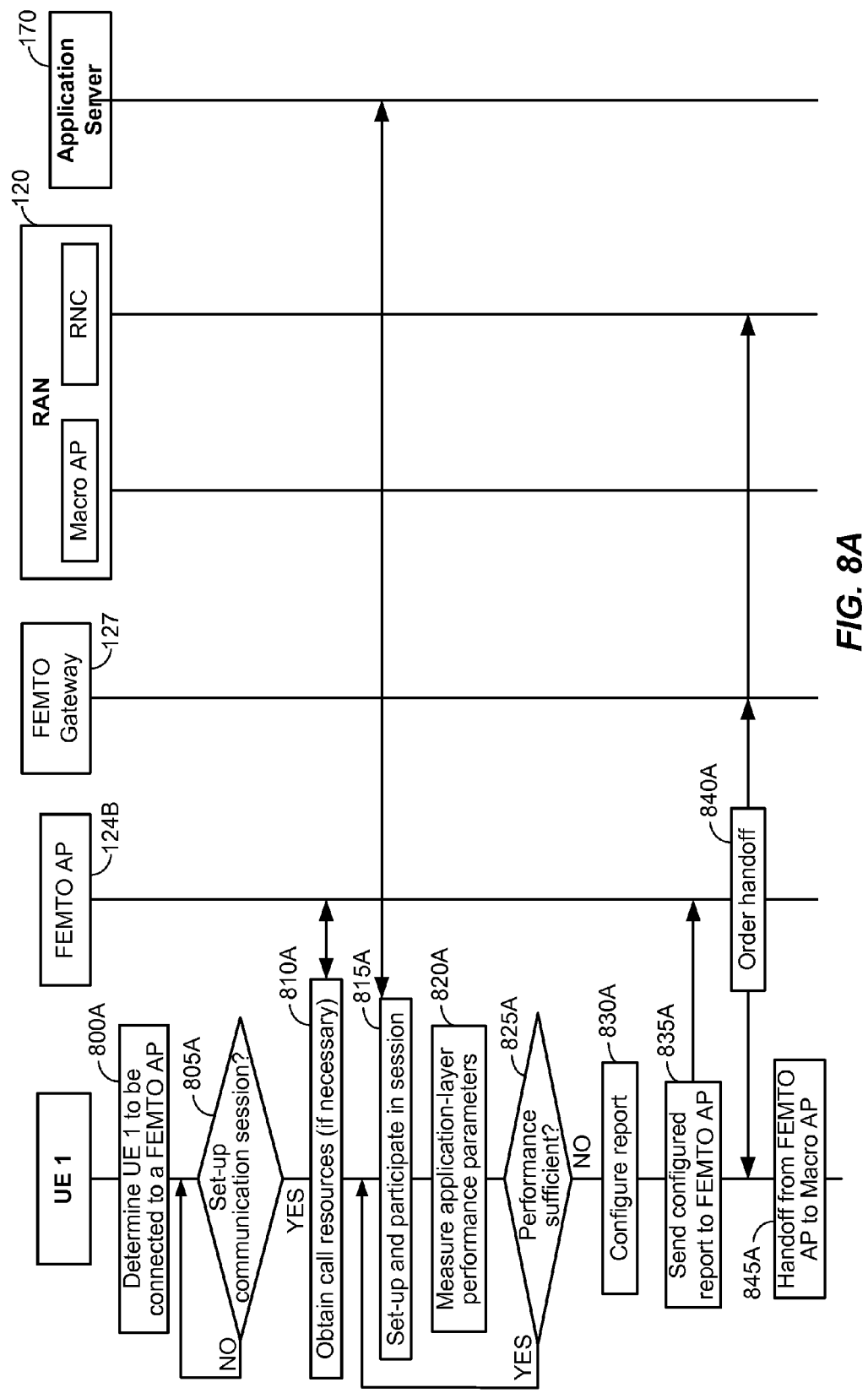
FIG. 8A illustrates a process of evaluating application-layer performance parameters when making handoff decisions in accordance with an embodiment of the invention.
Figure 8B:
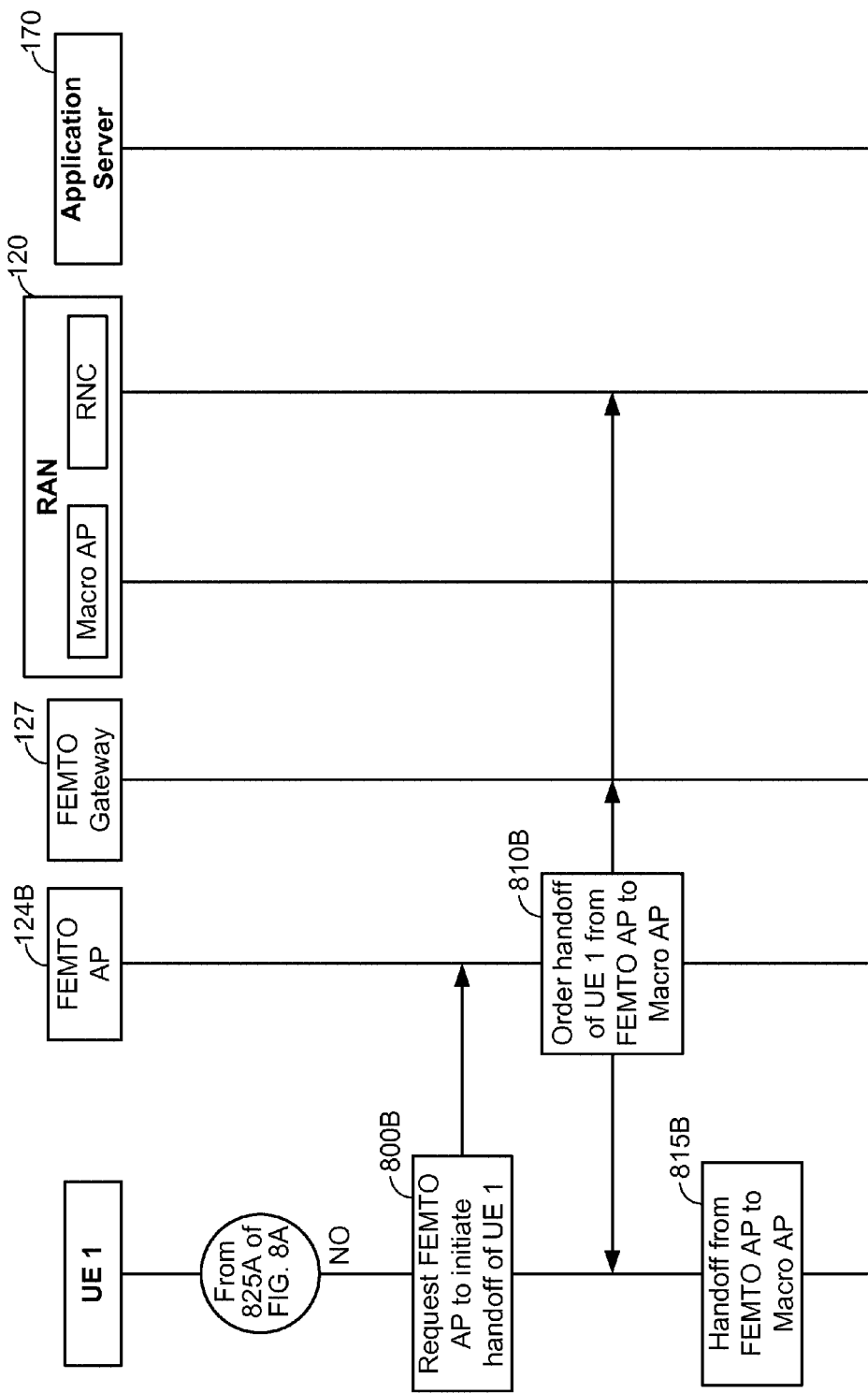
FIG. 8B illustrates another process of evaluating application-layer performance parameters when making handoff decisions in accordance with an embodiment of the invention.

Referring to FIG. 6B, assume that UE 1 is located in a given macro-cell (i.e., UE 1 is being served by a given macro AP) and is actively participating in a communication session (e.g., with UE 2 as in FIG. 6A, although UE 2 is not shown in this example for convenience of explanation), 600B. Next, assume that the RNC 122 serving UE 1 determines to handoff UE 1 from UE 1's current serving macro AP to a FEMTO AP, and thereby orders the handoff, 605B. In an example, the handoff-order of 605B can be based upon UE 1 receiving a FEMTO AP pilot signal, which causes UE 1 to prompt a user thereof to provide an indication with regard to whether to transition from the macro AP to the FEMTO AP. If the user instructs UE 1 to perform the handoff, the handoff of 605B can then be triggered by UE 1 as shown in FIG. 8A or 8B (when modified for a macro-to-FEMTO AP-transition). As such, UE 1 hands off from the macro AP to the FEMTO AP in 610B. At this point, UE 1 continues its communication session that was supported by the macro AP on the FEMTO AP, 615B.

At some point after the handoff, UE 1 determines that its new serving Node B corresponds to a FEMTO AP, 620B. For example, the determination of 620B can be in response to receiving an overhead message from the FEMTO AP as discussed above with respect to 507 through 530 of FIG. 5. Upon determining that UE 1 serving Node B is now a FEMTO AP in 620B, UE 1 sends a communication session related signaling message to the application server 170 to notify the application server 170 of its presence in FEMTO AP coverage and to request that the application server 170 modify its participation in the communication session, 625B.

As will be appreciated, the modification of 625B can refer to augmenting the capabilities of the existing communication session. For example, UE 1 can request to activate features available for the communication session that are cheaper in FEMTO-cells as compared to macro-cells, such as transitioning the communication session from an audio-only session to a video conference that includes both audio and video, because the extra bandwidth used for the video-feed becomes more affordable or available. As will be appreciated, the modification involves the UE 1 sending a request to the application server 170 and the application server 170 thereafter enforcing the modification based on the capabilities of other participants in the communication session (not shown). UE 1 also notifies its user that it is now operating within a FEMTO-cell in 630B, similar to 535 of FIG. 5 (e.g., so that the user of UE 1 can modify his/her behavior to take advantage of FEMTO-cell features).

At some later point in time, assume that the FEMTO AP serving UE 1 determines to handoff UE 1 from UE 1's current serving FEMTO AP to a macro AP, and thereby orders the handoff, 635B. In an example, the handoff-order of 635B can be based upon UE 1 receiving a macro AP pilot signal, which causes UE 1 to prompt a user thereof to provide an indication with regard to whether to transition from the FEMTO AP to the macro AP. If the user instructs UE 1 to perform the handoff, the handoff of 635B can then be triggered by UE 1 as shown in FIG. 8A or 8B. As such, UE 1 hands off from the FEMTO AP to the macro AP in 640B. At this point, UE 1 continues its communication session on the macro AP, 645B. At some point after the handoff, UE 1 determines that its new serving Node B corresponds to a macro AP, 650B. For example, the determination of 650B can be in response to not receiving a FEMTO AP specific overhead message from the macro AP as discussed above with respect to 550 through 555 of FIG. 5. Alternatively, whenever UE 1 hands off from a FEMTO-cell, UE 1 can be configured to assume that its target AP is non-FEMTO, and in the case that the target AP actually is a FEMTO AP, UE 1 can resume the modified or enhanced FEMTO-session upon making the FEMTO confirmation. In this example, when transitioning from a FEMTO AP to a macro AP, the user of UE 1 would not be charged at the higher rate between the handoff time and the time at which UE 1 realizes it is no longer operating in a FEMTO-AP.

Upon determining that UE 1's serving AP is no longer a FEMTO AP in 650B, UE 1 sends a communication session related signaling message to the application server 170 to notify the application server 170 of its presence in Macro AP coverage and request to modify its participation in the communication session, 655B. For example, the modification of 655B can correspond to un-doing or reversing the modification that was enacted in 625B upon entry into the FEMTO-cell. UE 1 also notifies its user that it is no longer operating within a FEMTO-cell in 660B, similar to 560 of FIG. 5 (e.g., so that the user of UE 1 can modify his/her behavior).

As will be appreciated, if a given UE participates in a communication session during which the given UE hands off between FEMTO APs and macro APs, the manner in which the session is billed can be different when the UE is served by a FEMTO AP versus the portions when the UE is served by a macro AP. Accordingly, it can be difficult for a user of the given UE to track his/her usage charges during the actual sessions. In other words, while the user of the given UE would likely be able to determine its total minutes used for the call, the given UE would not know how many minutes were used in serving areas of the FEMTO APs and how many minutes were used in serving areas of the macro APs, such that the actual cost to the user would be difficult to determine. Conventionally, the user of the given UE would be required to query either a billing server or usage tracking server in order to determine its usage for the communication session, and this would normally only be an option after the session had already ended. Accordingly, an embodiment of the invention is directed to a more dynamic usage tracking process for UEs participating in sessions that are supported, at different times, by both FEMTO APs and macro APs.

Figure 7:
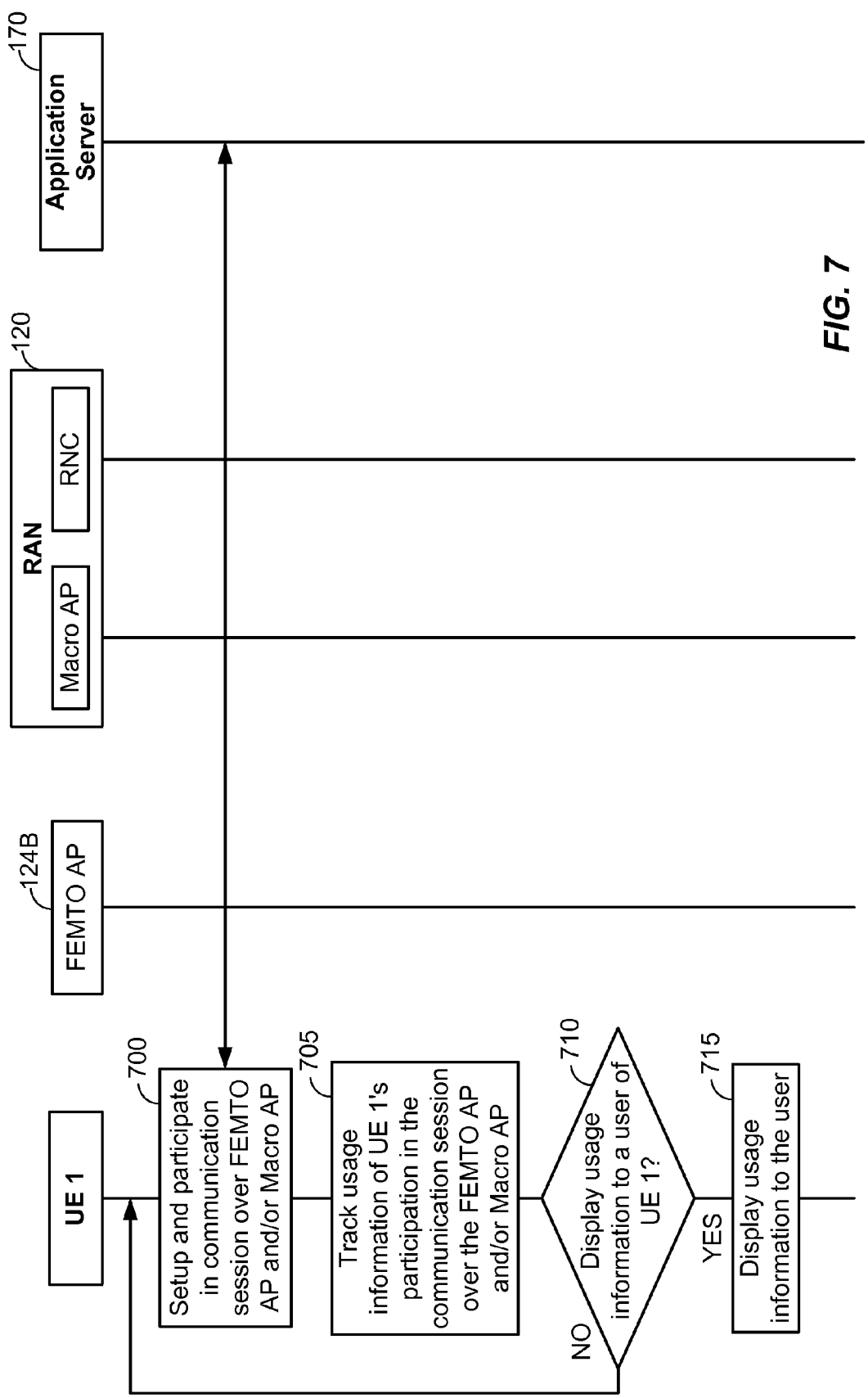
FIG. 7 illustrates a process of tracking usage for a UE participating in sessions that are supported, at different times, by both FEMTO APs and macro APs in accordance with an embodiment of the invention.

Referring to FIG. 7, a given UE ("UE 1") sets-up and then participates in a server-arbitrated communication session over a FEMTO AP and/or a macro AP, 700. For example, UE 1 can initially set-up the communication session in a FEMTO AP and then be handed off to a macro AP, or alternatively can initially set-up the communication session in a macro AP and then be handed off to a FEMTO AP. During the communication session, UE 1 tracks usage information of UE 1's participation in the communication session over the FEMTO APs and/or macro APs, 705. In particular, UE 1 tracks how long and/or what services were used when in FEMTO-cells during the communication session and UE 1 also tracks how long and/or what services were used when in macro-cells during the communication session. By contrast, conventional usage tracking mechanisms at UE 1 would normally track total-usage for the communication session, but would not selectively categorize the usage based on whether UE 1 was in a FEMTO-cell or macro-cell when the usage occurred.

In 710, UE 1 determines whether to display the tracked usage information to a user of UE 1. In an example, the determination of 710 can occur during the actual communication session, such that UE 1 can display dynamic or in-call usage information to its user. In another example, the determination of 710 can occur upon termination of the communication session, such that UE 1 displays the total-usage information for the communication session after the communication session terminates. In yet another example, the determination of 710 can be event-based such that UE 1 displays the tracked usage information in response to a user-request, irrespective of whether the communication session is on-going or over. Accordingly, if UE 1 determines not to display the tracked usage information to its user, the process returns to 700 and UE 1 either continues its current communication session or waits for its user to request set-up of another communication session. Otherwise, if UE 1 determines to display the tracked usage information to its user, the tracked usage information is displayed in 715. In an example, the usage-tracking described above in FIG. 7 can be performed by a multimedia client application running on UE 1.

As discussed above, performance of communication sessions conducted over FEMTO APs can generally expected to be different in some respects as compared to communication sessions conducted over macro APs. For example, FEMTO APs will generally have superior bandwidth and interference characteristics over its air interface 104B, as compared to the air interface 104A of macro-APs, because in most cases fewer UEs will be exchanging wireless signals with a FEMTO AP as compared to a macro-AP and UEs in FEMTO-cells will be closer to their serving APs. However, once a reverse-link message is transferred to a macro-AP, the macro-AP has a relatively direct wired backhaul connection to the RNC 122, whereas reverse-link messages from a FEMTO-AP are required to navigate through the Internet 175, where performance can be unpredictable. Similarly, downlink-messages from the RNC 122 can be relayed to a macro-AP in a direct manner, whereas downlink messages from FEMTO gateway 127 are sent to FEMTO APs through the unpredictable Internet 175.

Conventional decision logic related to when handoffs of a UE from one Node B to another Node B should be performed has generally attempted to optimize the wireless or air-interface link between UEs and their respective APs or Node Bs. For example, an important criteria related to handoffs of UEs between Node Bs is how strong a pilot-signal is when received at the UE. However, if a FEMTO AP's connection to the Internet 175 is slow, an excellent wireless link to the FEMTO AP from a UE will be insufficient to obtain good performance. Accordingly, embodiments of the invention described below with respect to FIGS. 8A through 8D are directed to evaluating application-layer performance parameters when making handoff decisions, as opposed to relying upon the quality of the wireless physical-link between the UE and its serving AP.

Referring to FIG. 8A, 800A through 815A correspond to 600A through 615A of FIG. 6A, and as such will not be described further for the sake of brevity. Accordingly, after 815A, assume that UE 1 is participating in the communication session and is being served by a FEMTO AP.

Next, UE 1 measures one or more application-layer performance parameters for the communication session supported by the FEMTO AP, 820A. For example, the one or more application-layer performance parameters can include (i) an error rate measurement (e.g., a packet error rate (PER), a message error rate, a media-error-rate (MER), etc.) associated with the communication session (e.g., based on a success rate of audio frames if the communication session is an audio session, based on a success rate of video and/or audio frames if the communication session is a video conference), (ii) an outage duration (OD) of the communication session (e.g., a period of downlink inactivity due to successive media errors on the communication session), (iii) a rate at which the first system is currently charging a user of UE 1 for usage related to the communication session), (iv) the UE 1's status as floor-holder or listener if the communication corresponds to a half-duplex PTT session, (v) a priority of the user of UE 1, (vi) delay jitter, and/or (vii) any combination thereof.

In a further example, with respect to 820A of FIG. 8A, while participating in a communication session, UE 1 can measure the application performance using Packet-Error-Rate and Delay Jitter metrics computed from the application data received at UE 1 from the FEMTO AP. In another example, UE 1 can be configured to send/receive Real-time Control Protocol (RTCP) reports for Real-time Transport Protocol (RTP) media and obtain the Packet-Error-Rate and Latency performance feedback from a receiver or target of the communication session through these reports. The receiver configured to transmit RTCP reports can be an application server, which arbitrates the communication session between the originator and target devices, or can be the target wireless communication session device itself. As these reports are based on the end-to-end performance and involve multiple links in between, the performance estimate may not directly reflect the performance of the DSL link or the link of UE 1's serving FEMTO AP to the FEMTO gateway 127. In order to obtain a close estimate of the performance of the DSL link between UE and FEMTO gateway, in another example the GGSN 165 can act as a RTCP proxy agent and estimate the performance of the link and send RTCP reports to UE1 in addition to the RTCP reports sent by the application server or the target wireless device. The GGSN 165 can read the IP packets received from the UE 1 to identify that the packets contain RTP data, and include the estimated performance of the link in the standard RTCP report format, which can be recognized by the RTP application source on UE1. Typically, the link between GGSN and FEMTO gateway is over provisioned and does not have much impact to the performance. Also assuming that FEMTO AP typically has good RF coverage, UE 1 can then use these estimates received from GGSN as an indication of the perceived application performance on the DSL link.

After measuring the one or more application-layer performance parameters in 820A, UE 1 determines whether its application-layer performance is sufficient, 825A. For example, if the MER for the session is determined to be very low, UE 1 may determine that the application-layer performance of the communication session is insufficient, even if UE 1's wireless physical-layer connection to its serving FEMTO AP is strong. In another example, if delay jitter for the session is higher than a threshold, UE 1 may determine that the application-layer performance of the communication session is insufficient. If UE 1 determines the application-layer performance for the communication session to be sufficient in 825A, the process returns to 815A and UE 1 continues its communication session over the FEMTO AP.

As will be appreciated, users may be charged at a subsidized rate while using services in FEMTO AP and user may prefer to stay in FEMTO AP coverage even when application performance is impacted due to DSL link congestion. So, UE 1 and/or the FEMTO AP can be configured to consider User Preference as a factor in determining whether application performance related handoff from FEMTO AP to Macro AP should be performed, irrespective of the measured application-layer performance parameters. In other words, the thresholds in 825A can be established such that the FEMTO AP's performance must be considerably worse than the macro AP's expected performance for a FEMTO-to-macro handoff to occur.

For example, if User Preference is to perform handoffs when a desired level of application-layer performance is not met, UE 1 can measure the application-layer performance parameters (e.g., Packet-Error-Rate, Delay Jitter and Latency metrics) and can compare these metrics with the desired application performance thresholds as shown in 825A. If UE 1 observes that at least one of the application performance metrics is above the defined threshold limits, then UE 1 can request the handoff procedures.

To avoid a 'Ping-Pong' effect (e.g., to reduce unnecessary handoffs from the FEMTO AP to the macro AP), UE 1 can maintain a timer and use a timer based hysteresis on estimated application performance metrics to decide whether a handoff is necessary. In this example, the hysteresis timer value can be chosen so as to avoid unnecessary handoffs and at the same time reduce the duration for which application performance is impacted.

Returning to 825A of FIG. 8A, if UE 1 determines that the application-layer performance for the communication session is not sufficient, UE 1 configures a 'fake' pilot signal strength measurement report that is set to indicate an artificially low value for the measured strength of the FEMTO AP's pilot signal at UE 1, 830A. In other words, FIG. 8A illustrates an example whereby the FEMTO AP is configured to make handoff decisions for its UEs based on pilot signal strength measurement reports, as is known in the art. Accordingly, by manipulating the pilot signal strength measurement report at UE 1 in FIG. 8A, UE 1 can trigger a handoff responsive to application-layer conditions even where its physical-layer link to the serving FEMTO AP is strong without necessarily modifying the operation of the FEMTO AP 124B.

In 835A, UE 1 sends the configured pilot signal strength measurement report to the serving FEMTO AP, and the FEMTO AP orders UE 1 to be handed off from the FEMTO AP to a macro AP, 840A. As will be appreciated, block 840A assumes that another macro AP is available for handling UE 1's communication session. Responsive to the handoff-order of the FEMTO AP in 840A, UE 1 hands off from the FEMTO AP to the macro AP, 845A.

FIG. 8B illustrates an alternative embodiment of the process of FIG. 8A. In FIG. 8A, assume that 800A through 825A of FIG. 8A are performed, and that the decision block of 825A determines the application-layer performance for UE 1's communication session to be insufficient. At this point, the process advances to 800B of FIG. 8B instead of 830A of FIG. 8A.

Referring to FIG. 8B, instead of configuring a pilot signal strength measurement report with a false indication of the FEMTO AP's pilot signal strength as received at UE 1, UE 1 sends a request to the serving FEMTO AP for the FEMTO AP to facilitate a handoff of UE 1, 800B. In an example, the request of 800B can correspond to a proprietary message (e.g., a StorageBlob message), that is not defined by a standard, in which case the FEMTO AP is assumed to be configured to interpret the request of 800B as a handoff request. The FEMTO AP receives the handoff request from UE 1 and performs the handoff procedures to move UE 1 from the FEMTO AP to Macro AP, 810B.

Accordingly, upon receiving the handoff request message from 800B, the FEMTO AP orders UE 1 to be handed off from the FEMTO AP to a macro AP, 810B. In 810B, the FEMTO AP explicitly orders UE 1 to perform the handoff to the macro AP. As will be appreciated, block 810B assumes that another macro AP is available for handling UE 1's communication session. Responsive to the handoff-order of the FEMTO AP in 810B, UE 1 hands off from the FEMTO AP to the macro AP, 815B.

In the embodiments of FIGS. 8A and 8B, UE 1 is responsible for monitoring the application-layer performance for the communication session and, if necessary, facilitating a handoff to another AP by sending a specially configured pilot strength measurement report (e.g., FIG. 8A) or sending a handoff request to serving FEMTO AP to handoff UE 1 (e.g., FIG. 8B). In other embodiments of the invention, which are described below with respect to FIGS. 8C and 8D, the application-layer performance for UE 1's communication session can instead be monitored at the FEMTO AP itself, which can then facilitate a handoff of UE 1 to another AP based on its own measurements of UE 1's application-layer performance.

Figure 8C:
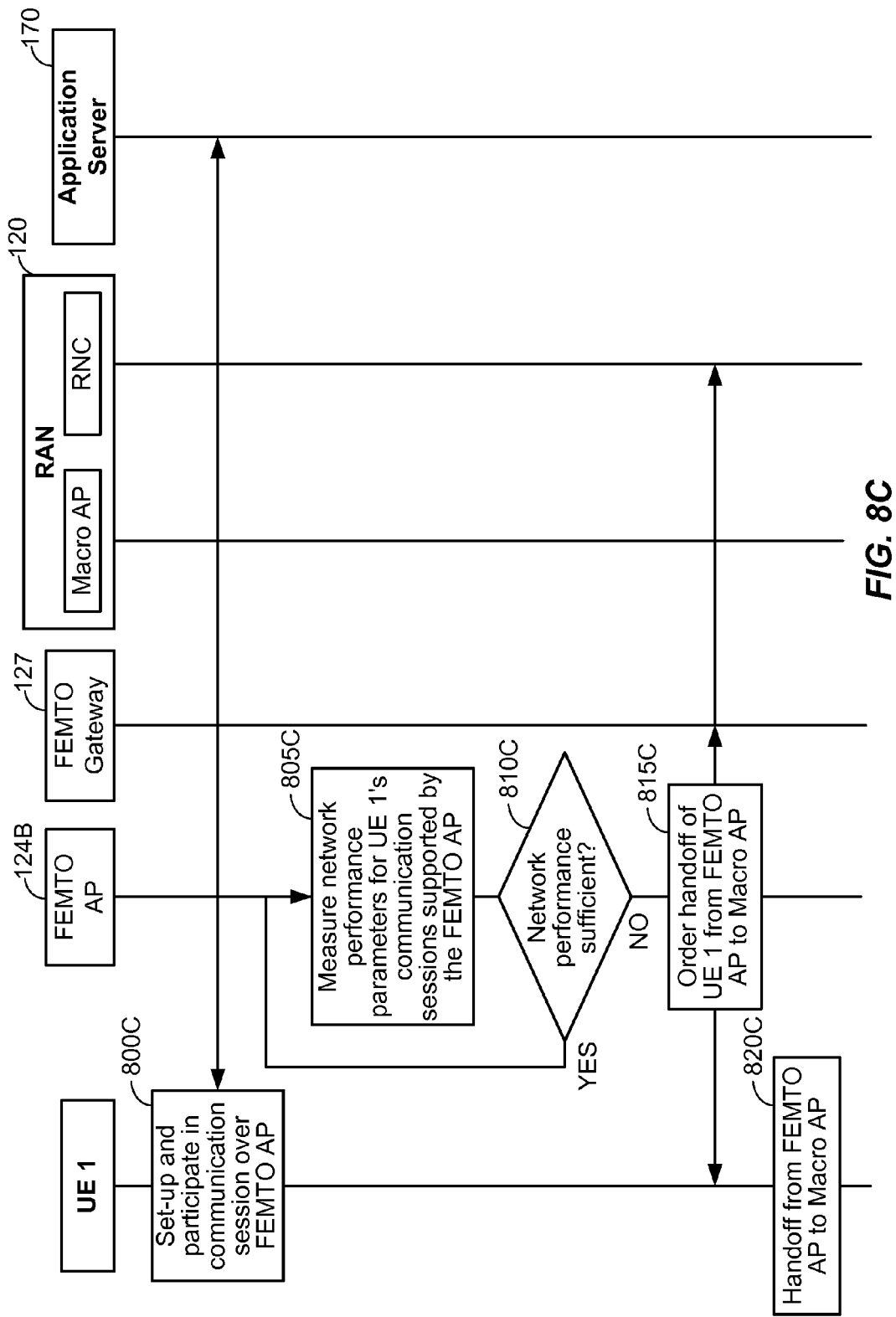
FIG. 8C illustrates another process of evaluating application-layer performance parameters when making handoff decisions in accordance with an embodiment of the invention.

Referring to FIG. 8C, UE 1 sets up a communication session that is arbitrated by the application server 170 over a FEMTO AP, 800C. As noted in other embodiments of the invention, UE 1's connection to the FEMTO AP may be supported by call resources such as a TCH and QoS resources, or alternatively may simply occur over a shared channel due to the reduced wireless contention expectation for FEMTO-cells.

Next, the FEMTO AP serving UE 1 measures one or more network performance parameters associated with UE 1's communication session, 805C. In an embodiment of the invention, the network performance parameter(s) measured at the FEMTO AP can include network-specific parameters associated with UE 1's communication session, such as QoS parameters such as bandwidth on the link between the FEMTO AP (FAP) and the FEMTO gateway (FGW) 127. For example, the FEMTO AP may periodically estimate the bandwidth of its link to the FEMTO Gateway (e.g., the DSL link between FAP and FGW), which can be measured using well-known heuristics such as the Packet Pair or CaPProbe algorithm amongst others.

In a further example, referring to 805C of FIG. 8C, the FEMTO AP may be serving multiple UEs with different application QoS requirements at any given point of time. In order to perform handoffs of the respective UEs from the FEMTO AP to a macro AP, the FEMTO AP can measure network performance of each active application flow that is being served. For Example, in UMTS networks, the FEMTO AP can measure the performance for each active Radio Access Bearer (RAB). The FEMTO AP can measure the network performance over the DSL link periodically estimating the bandwidth of the link between FEMTO AP and the FEMTO gateway 127 using well-known heuristics such as the Packet Pair or CaPProbe algorithms as discussed above. Assuming that the FEMTO AP has good RF coverage, the FEMTO AP can then use these estimates as an indication of network performance for UE 1 and/or other UEs being served by the FEMTO AP.

After measuring the one or more network performance parameters (e.g., QoS parameters) in 805C, the FEMTO AP determines whether the measured network performance is sufficient for UE 1's communication session, 810C. For example, if the measured level of bandwidth of the FEMTO AP's link to the FEMTO gateway 127 is less than a threshold, the FEMTO AP can determine the network performance for the communication session to be insufficient.

For example, in 810C, the FEMTO AP can compare the measured network-performance metrics (e.g., Bandwidth, Packet-Error-Rate, and/or Latency metrics) with one or more thresholds for each active application flow of each UE being served by the FEMTO AP. If the FEMTO AP observes that at least one of the network-performance metrics fails to satisfy a given relationship to one of the defined threshold limits for a hysteresis timer period, then the FEMTO AP can consider that the application flow or the UE associated with the application flow requires a handoff to a macro AP.

If the FEMTO AP determines the network performance for UE 1's communication session to be sufficient in 810C, the process returns to 805C and the FEMTO AP continues to support UE 1's communication session. Otherwise, if the FEMTO AP determines that the network performance for UE 1's communication session is not sufficient in 810C, the process advances to 815C, 815C and 820C of FIG. 8C substantially correspond to 810B and 815B of FIG. 8B, respectively, and will not be described further for the sake of brevity.

FIG. 8D illustrates an alternative embodiment of the process of FIG. 8C. In FIG. 8D, assume that 800C through 810C of FIG. 8C are performed, and that the decision block of 810C determines the network performance for UE 1's communication session to be insufficient. At this point, the process advances to 800D of FIG. 8D instead of 815C of FIG. 8C.

Referring to FIG. 8D, instead of explicitly ordering the handoff of UE 1 in response to the insufficient network-performance determination, the FEMTO AP reduces the transmission power level of its pilot signal, 800D, and then transmits the pilot signal at the reduced transmission power level, 805D. This effectively reduces the serving area covered by the FEMTO AP. As will be appreciated, one potential reason for poor network performance as measured at the FEMTO AP is backhaul messages between the FEMTO gateway 127 and the FEMTO AP, which can occur when the FEMTO AP is serving a relatively high number of UEs. By reducing the pilot signal transmission power, fewer UEs will detect the FEMTO AP, which can likewise reduce the traffic between the FEMTO AP and the FEMTO gateway 127 so as to improve the quality of the link. In this case, upon determining that network performance is insufficient in 810C, the particular channel quality estimation for UE 1 can be used to determine an amount by which the transmission power level is reduced in 800D and 805D (e.g., so that UE 1 is dropped but other UEs are not necessarily affected).

Accordingly, UE 1 receives the pilot signal that is transmitted at the reduced transmission power level, measures a lower pilot signal strength than was previously measured at UE 1, and sends a pilot signal strength measurement report to the FEMTO AP reporting the lower pilot signal strength of the FEMTO AP's pilot signal, 810D. While not shown in FIG. 8D, it will be appreciated that any other UEs being served by the FEMTO AP will also report a weaker pilot signal strength for the FEMTO AP. In FIG. 8D, assume that UE 1 is among the UEs reporting a pilot signal strength for the FEMTO AP that is low enough to prompt a handoff of UE 1 to another AP. Accordingly, upon receiving the pilot signal strength measurement report from UE 1, the FEMTO AP orders the UE 1 to be handed off from the FEMTO AP to a macro-AP, 815D. Thereafter, UE 1 is handed off from the FEMTO AP to the macro-AP, 820D.

As will be appreciated, the FEMTO AP can issue an explicit order for UE 1 to handoff to another AP as in FIGS. 8B and 8C, or the FEMTO AP can reduce its RF footprint by reducing its pilot signal transmission power, which potentially affects many UEs aside from UE 1. In an example, the FEMTO AP can choose to issue an explicit handoff of UE 1 to another AP if the measured performance degradation appears to be concentrated or focused on the real-time traffic application(s) associated with UE 1. In another example, if multiple UEs served by the FEMTO AP appear to be undergoing performance degradation, the cell-wide coverage reduction can be implemented as in FIG. 8D. For example, if the FEMTO AP determines that the DSL link seems to be very congested and the performance of all active application flows is degraded, then the FEMTO AP can reduce the transmitted pilot power strength. This drives the UEs to perform handoff by reporting weak pilots and prevents the UEs already accessing the Macro AP from handing off to the FEMTO AP. While not shown in FIG. 8D, after performance improves when a given number of UEs handoff to the other AP, the FEMTO AP can increase the pilot power strength to back to the initial transmission level.

As discussed above, FEMTO APs cover smaller serving areas as compared to macro APs Thereby, with respect to macro-APs, when a given UE becomes aware that it is in range of a particular macro AP, the given UE knows its approximate location. For example, assume a macro AP has a 5 mile serving area radius. When the given UE identifies the macro AP, the given UE can determine at a relatively high confidence level that the given UE is positioned within 5 miles of the macro AP's known location. It will be thereby appreciated that while the location of the macro AP is helpful in narrowing down the possible set of locations of the given UE, the macro AP's location generally not accurate enough to be used in place of the given UE's actual location for location-based services for the given UE that require a more precise location fix in the absence of GPS support on the UE. The smaller serving area associated with FEMTO APs, however, can permit a given FEMTO AP's location to be used as an assumed position for the given UE for most location based services, as will be described below with respect to FIG. 9.

Figure 9:
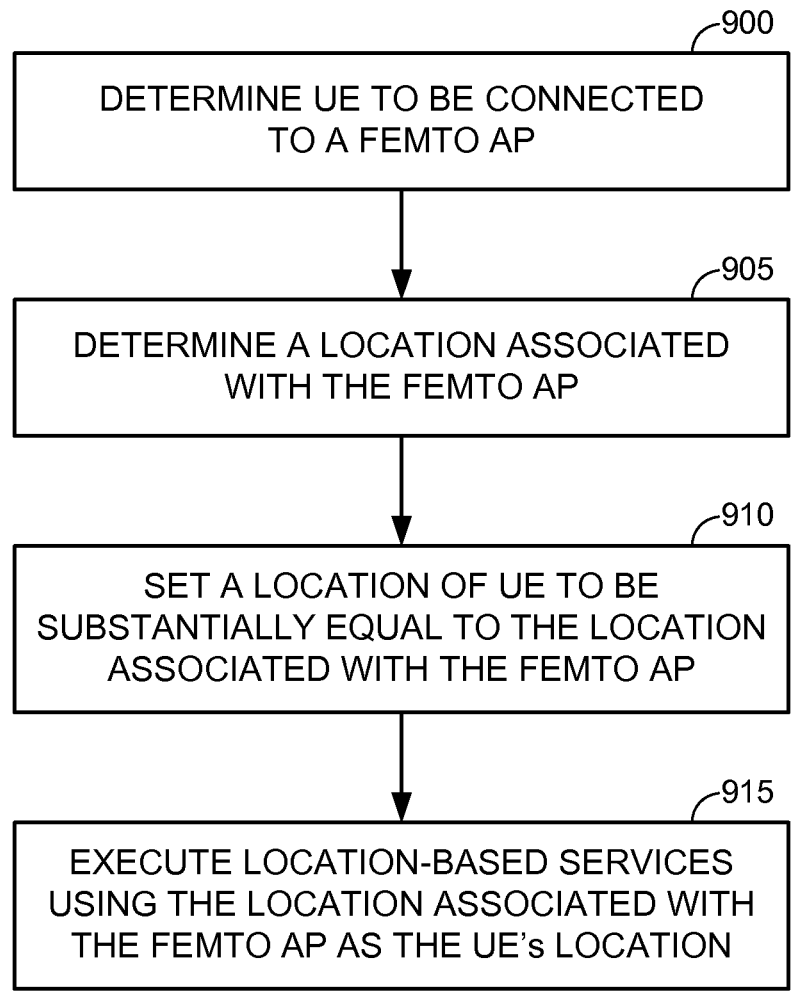
FIG. 9 illustrates a process of performing location-based services for a given UE based on associating a location of a serving FEMTO AP as the location for the given UE in accordance with an embodiment of the invention.

Referring to FIG. 9, the UE determines that it is connected to a FEMTO AP, 900. As will be appreciated, the determination of 900 can correspond to 530 of FIG. 5, 600A of FIG. 6A, 620B of FIG. 6B and/or 800A of FIG. 8A. Next, the UE determines the location associated with the FEMTO AP, 905 based on the received overhead messages from the FEMTO AP containing the FEMTO AP location information. After determining the location of the FEMTO AP, the UE sets its location to be substantially equal to the FEMTO AP's location, 910.

After setting its location to the FEMTO AP's location, the UE can perform location-based services for the given user using the FEMTO AP's location as the location for the given UE, 915. Examples of location-based services that are capable of being performed by UEs are described in more detail in co-pending U.S. patent application Ser. No. 12/727, 986, entitled "REGULATING THE SCOPE OF SERVICE GEOGRAPHICALLY IN WIRELESS NETWORKS", filed Mar. 19, 2010, which is assigned to the assignee hereof and hereby expressly incorporated by reference herein in its entirety.

As will be appreciated by one of ordinary skill in the art, the FEMTO AP's location is relatively close to the locations of the UEs being served by the FEMTO AP, and retrieving the FEMTO AP's location can potentially be faster and can consume less resources (e.g., in terms of power, processing load, etc.) then performing a location positioning procedure (e.g., a GPS positioning procedure, etc.) of the UE. Accordingly, the process of FIG. 9 can reduce delays and/or resource consumption associated with a conventional determination of a UE being served by a FEMTO AP.

While embodiments of the invention are described above as if transitions to FEMTO cells will be performed by virtue of FEMTO APs having superior performance as compared to macro APs, in other embodiments this is not necessarily the case. For example, in one embodiment, the target communication devices can be on a high speed link via a macro AP that is comparable in performance to a FEMTO AP. In this case, the target communication devices can still use the FEMTO AP. Thus, the above-described embodiments are applicable even where the FEMTO-option is not necessarily superior in terms of performance. For example, one reason for this may be cost-savings associated with FEMTO access (e.g., bandwidth is costlier over the macro AP versus the FEMTO AP, etc.). In another embodiment, FEMTO APs can be used for communication sessions that are not necessarily instantaneous or in real-time between active participants. For example, FEMTO APs can be used in scenarios where the communication session is related to delayed delivery of media, such as a MMS session.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of setting up a communication session to be arbitrated by an application server in a wireless communications system, comprising:
   determining that a current serving access point (AP) of a wireless communications device corresponds to a FEMTO AP;
   configuring at least one message to request initiation of the communication session to be arbitrated by the application server and to indicate that the wireless communications device is FEMTO-connected based on the determination; and
   transmitting the configured at least one message to the application server,
   wherein when the determining, the configuring and the transmitting are performed by an originating wireless communications device of the communication session, the configured at least one message corresponds to a communication session setup request message that requests initiation of the communication session and has a first field set to indicate that the originating wireless communications device is FEMTO-connected, and
   wherein when the determining, the configuring and the transmitting are performed by a target wireless communications device of the communication session, the configured at least one message corresponds to an acknowledgment to a communication session setup announce message that announces the communication session to the target wireless communications device and has a second field set to indicate that the target wireless communications device is FEMTO-connected.

2. The method of claim 1, wherein the is based on information contained in a periodically transmitted overhead message from the FEMTO AP.

3. The method of claim 1, wherein, responsive to the determining, the transmitting transmits the configured at least one message on a reverse-link shared access channel instead of setting up a traffic channel (TCH) on which to transmit the configured at least one message.

4. The method of claim 3, wherein the reverse-link shared access channel corresponds to a random access channel (RACH) in WCDMA networks.

5. The method of claim 3, wherein the transmitting transmits the configured at least one message on the reverse-link shared access channel as a mobile-originated (MO) Data-over-Signaling (DoS) message in 1xEV-DO networks.

6. The method of claim 3, wherein the wireless communications device performing the determining, the configuring and the transmitting is configured to use the reverse-link shared access channel exclusively for initial communication session setup message transmissions as long as the wireless communications device is FEMTO-connected based on an expectation that being FEMTO-connected is associated with less physical-layer resource contention as compared to a macro AP.

7. The method of claim 1, wherein the application server is external to a carrier network that operates the FEMTO AP.

8. The method of claim 1, wherein the configuring and the transmitting are performed whenever the wireless communications device is determined to be served by any FEMTO AP.

9. The method of claim 1, wherein the configured at least one message is configured to indicate that the wireless communications device is FEMTO-connected without modifying a Session Initiation Protocol (SIP) registration of the wireless communications device.

10. A method of operating a wireless communications device configured to participate in a communication session being arbitrated by an application server in a wireless communications system, comprising:
during the communication session, determining by the wireless communications device that a current serving access point (AP) of the wireless communications device corresponds to a FEMTO AP, wherein the FEMTO AP is part of a serving network and the application server is external to an access network component and a core network component of the serving network;
configuring, by the wireless communications device, at least one signaling message related to the communication session to indicate to the application server that the wireless communications device is FEMTO-connected in response to based on the determination; and
transmitting, by the wireless communications device, the configured at least one signaling message to the application server,
wherein the configured at least one signaling message corresponds to an in-call signaling message that requests the application server to augment one or more parameters of the communication session and has a field set to indicate that the wireless communications device is FEMTO-connected.

11. The method of claim 10, wherein the determining is based on information contained in a periodically transmitted overhead message from the FEMTO AP.

12. The method of claim 10, wherein the determining occurs after the wireless communications device hands off from a macro AP to the FEMTO AP.

13. The method of claim 10, wherein the application server is external to a carrier network that operates the FEMTO AP.

14. A wireless communications device configured to set up a communication session to be arbitrated by an application server in a wireless communications system, comprising:
means for determining that a current serving access point (AP) of the wireless communications device corresponds to a FEMTO AP;
means for configuring at least one message to request initiation of the server-arbitrated communication session to be arbitrated by the application server and to indicate that the wireless communications device is FEMTO-connected based on the determination; and
means for transmitting the configured at least one message to the application server,
wherein when the wireless communications device is an originating wireless communications device of the communication session, the configured at least one message corresponds to a communication session setup request message that requests initiation of the communication session and has a first field set to indicate that the originating wireless communications device is FEMTO-connected, and
wherein when the wireless communications device is a target wireless communications device of the communication session, the configured at least one message corresponds to an acknowledgment to a communication session setup announce message that announces the communication session to the target wireless communications device and has a second field set to indicate that the target wireless communications device is FEMTO-connected.

15. A wireless communications device configured participate in a communication session being arbitrated by an application server in a wireless communications system, comprising:
means for, during the communication session, determining that a current serving access point (AP) of the wireless communications device corresponds to a FEMTO AP, wherein the FEMTO AP is part of a serving network and the application server is external to an access network component and a core network component of the serving network;
means for configuring at least one signaling message related to the communication session to indicate to the application server that the wireless communications device is FEMTO-connected in response to the determination; and
means for transmitting the configured at least one signaling message to the application server,
wherein the configured at least one signaling message corresponds to an in-call signaling message that requests the application server to augment one or more parameters of the communication session and has a field set to indicate that the wireless communications device is FEMTO-connected.

16. A wireless communications device configured to set up a communication session to be arbitrated by an application server in a wireless communications system, comprising:
a processor coupled to a transceiver and configured to determine that a current serving access point (AP) of the wireless communications device corresponds to a FEMTO AP,
wherein the processor is configured to configure at least one message to request initiation of the communication session to be arbitrated by the application server and to indicate that the wireless communications device is FEMTO-connected based on the determination; and
wherein the transceiver is configured to transmit the configured at least one message to the application server,
wherein when the wireless communications device is an originating wireless communications device of the communication session, the configured at least one message corresponds to a communication session setup request message that requests initiation of the communication session and has a first field set to indicate that the originating wireless communications device is FEMTO-connected, and
wherein when the wireless communications device is a target wireless communications device of the communication session, the configured at least one message corresponds to an acknowledgment to a communication session setup announce message that announces the communication session to the target wireless communications device and has a second field set to indicate that the target wireless communications device is FEMTO-connected.

17. A wireless communications device configured participate in a communication session being arbitrated by an application server in a wireless communications system, comprising:
- a processor coupled to a transceiver and configured to determine that a current serving access point (AP) of the wireless communications device corresponds to a FEMTO AP, during the communication session, wherein the FEMTO AP is part of a serving network and the application server is external to an access network component and a core network component of the serving network,
- wherein the processor is configured to configure at least one signaling message related to the communication session to indicate to the application server that the wireless communications device is FEMTO-connected in response to the determination, and
- wherein the transceiver is configured to transmit the configured at least one signaling message to the application server,
- wherein the configured at least one signaling message corresponds to an in-call signaling message that requests the application server to augment one or more parameters of the communication session and has a field set to indicate that the wireless communications device is FEMTO-connected.

18. A non-transitory computer-readable storage medium containing instructions stored thereon, which, when executed by a wireless communications device configured to set up a communication session to be arbitrated by an application server in a wireless communications system, cause the wireless communications device to perform operations, the instructions comprising:
- program code to determine that a current serving access point (AP) of the wireless communications device corresponds to a FEMTO AP;
- program code to configure at least one message to request initiation of the communication session to be arbitrated by the application server and to indicate that the wireless communications device is FEMTO-connected based on the determination; and
- program code to transmit the configured at least one message to the application server,
- wherein when the wireless communications device is an originating wireless communications device of the communication session, the configured at least one message corresponds to a communication session setup request message that requests initiation of the communication session and has a first field set to indicate that the originating wireless communications device is FEMTO-connected, and
- wherein when the wireless communications device is a target wireless communications device of the communication session, the configured at least one message corresponds to an acknowledgment to a communication session setup announce message that announces the communication session to the target wireless communications device and has a second field set to indicate that the target wireless communications device is FEMTO-connected.

19. A non-transitory computer-readable storage medium containing instructions stored thereon, which, when executed by a wireless communications device configured participate in a communication session being arbitrated by an application server in a wireless communications system, cause the wireless communications device to perform operations, the instructions comprising:
- program code to determine that a current serving access point (AP) of the wireless communications device corresponds to a FEMTO AP, during the communication session, wherein the FEMTO AP is part of a serving network and the application server is external to an access network component and a core network component of the serving network;
- program code to configure at least one signaling message related to the communication session to indicate to the application server that the wireless communications device is FEMTO-connected in response to the determination; and
- program code to transmit the configured at least one signaling message to the application server,
- wherein the configured at least one signaling message corresponds to an in-call signaling message that requests the application server to augment one or more parameters of the communication session and has a field set to indicate that the wireless communications device is FEMTO-connected.

* * * * *

UNITED STATES PATENT AND TRADEMARK OFFICE
CERTIFICATE OF CORRECTION

PATENT NO. : 9,544,943 B2
APPLICATION NO. : 12/939753
DATED : January 10, 2017
INVENTOR(S) : Arvind V. Santhanam, Karthika Paladugu and Prashanth Hande It is certified that error appears in the above-identified patent and that said Letters Patent is hereby corrected as shown below:

In the Claims

Column 24, Line 42: "wherein the is" should be --wherein the determining is--.
Column 25, Line 27: "in response to based on the" should be --based on the--.

Signed and Sealed this
Seventh Day of March, 2017

Michelle K. Lee
*Director of the United States Patent and Trademark Office*